(12) United States Patent
Tyler

(10) Patent No.: US 7,452,165 B2
(45) Date of Patent: *Nov. 18, 2008

(54) CONTAINMENT SYSTEMS, METHODS, AND DEVICES

(76) Inventor: Rodney W. Tyler, 4424 Coddingville Rd., Medina, OH (US) 44256

(*) Notice: Subject to any disclaimer, the term of this patent is extended or adjusted under 35 U.S.C. 154(b) by 127 days.

This patent is subject to a terminal disclaimer.

(21) Appl. No.: 10/519,637

(22) PCT Filed: Jun. 25, 2003

(86) PCT No.: PCT/US03/20022

§ 371 (c)(1),
(2), (4) Date: Dec. 28, 2004

(87) PCT Pub. No.: WO2004/002834

PCT Pub. Date: Jan. 8, 2004

(65) Prior Publication Data

US 2005/0254899 A1    Nov. 17, 2005

Related U.S. Application Data

(60) Provisional application No. 60/449,415, filed on Feb. 24, 2003, provisional application No. 60/392,430, filed on Jun. 28, 2002.

(51) Int. Cl.
*E02B 3/12* (2006.01)
*E02D 3/00* (2006.01)
*E02D 17/20* (2006.01)
*B65B 1/12* (2006.01)
*B65B 1/16* (2006.01)
*B65B 7/02* (2006.01)

(52) U.S. Cl. .......... 405/302.6; 405/19; 53/469; 53/479

(58) Field of Classification Search ............... 405/107, 405/111, 114, 115, 302.4, 302.6; 210/170.01, 210/170.03, 170.09, 170.1; 53/138.2, 138.3, 53/138.4, 138.5, 138.7, 138.8, 567
See application file for complete search history.

(56) References Cited

U.S. PATENT DOCUMENTS

| | | | |
|---|---|---|---|
| 2,201,279 A | 5/1940 | Willing |
| 2,605,589 A | 8/1952 | Kuestner |
| 2,842,297 A | 7/1958 | Friedman |
| 2,842,897 A | 7/1958 | Finn |
| 3,214,866 A | 11/1965 | Halleek |
| 3,320,696 A | 5/1967 | Wright |

(Continued)

OTHER PUBLICATIONS

Albright Seed Company, "Construction Site Erosion Costly, Illegal", Jan. 1, 1997, 3 pages, Streamline Publications, US.

(Continued)

*Primary Examiner*—Michael Safavi
(74) *Attorney, Agent, or Firm*—Michael Haynes PLC; Michael N. Haynes

(57) ABSTRACT

A tubular mesh enclosure (1040) formed from a mesh material having a nominal opening size of less than 0.5 inches. The mesh enclosure has opposing pair of ends (1042, 1044) with at least one end (1044) being sealed. A filling (1010) is surrounded by the tubular mesh enclosure with the enclosure defining a length and a generally non-circular longitudinal cross-section defining a major width. A ratio of the length to the width greater than approximately 40.

172 Claims, 8 Drawing Sheets

U.S. PATENT DOCUMENTS

| | | | |
|---|---|---|---|
| 3,597,928 A | 8/1971 | Pilaar |
| 3,617,566 A | 11/1971 | Oshima |
| 3,957,098 A | 5/1976 | Hepworth |
| 3,979,146 A | 9/1976 | Berg |
| 4,297,810 A | 11/1981 | Hansford |
| 4,405,257 A | 9/1983 | Nielsen |
| 4,650,368 A | 3/1987 | Bayer |
| 4,788,936 A | 12/1988 | Billings |
| 4,799,821 A | 1/1989 | Brodersen |
| 4,934,094 A | 6/1990 | Walton |
| 5,015,123 A | 5/1991 | Houk |
| 5,030,031 A | 7/1991 | Brown |
| 5,205,068 A | 4/1993 | Solomou |
| 5,226,255 A | 7/1993 | Robertson |
| 5,310,288 A | 5/1994 | Huang |
| 5,358,356 A | 10/1994 | Romanek |
| 5,405,217 A | 4/1995 | Dias |
| 5,456,733 A | 10/1995 | Hamilton |
| 5,519,985 A | 5/1996 | Dyck |
| 5,555,674 A | 9/1996 | Molnar |
| 5,595,458 A | 1/1997 | Grabhorn |
| 5,605,416 A | 2/1997 | Roach |
| 5,658,096 A | 8/1997 | Von Kanel |
| 5,678,954 A | 10/1997 | Bestmann |
| 5,679,247 A | 10/1997 | Burke |
| 5,683,810 A | 11/1997 | Babbitt |
| 5,718,802 A | 2/1998 | Collier |
| 5,735,982 A | 4/1998 | Prunty |
| 5,747,633 A | 5/1998 | Ito |
| 5,802,763 A | 9/1998 | Milstein |
| 5,806,445 A | 9/1998 | Decker |
| 5,854,304 A | 12/1998 | Garcia |
| 5,983,561 A | 11/1999 | Behrens |
| 6,029,395 A | 2/2000 | Morgan |
| 6,085,810 A | 7/2000 | Castillo |
| 6,109,835 A | 8/2000 | Grabhorn |
| 6,135,672 A | 10/2000 | Davidson |
| 6,171,984 B1 | 1/2001 | Paulson |
| 6,286,253 B1 | 9/2001 | Decker |
| 6,658,790 B2 | 12/2003 | Skuba |
| 2001/0053545 A1 | 12/2001 | Engwer |
| 2002/0146394 A1 | 10/2002 | Stamets |
| 2003/0000139 A1 | 1/2003 | Anderson |
| 2006/0236603 A1 | 10/2006 | Egan |

OTHER PUBLICATIONS

Bentjen, "Bioremediation and Phytoremediation Glossary", [http://members.tripod.com/~bioremediation/], Jan. 1, 1998, 8 pages.

California Integrated Waste Management Board, "Erosion Control", [http://www.ciwmb.ca.gov/Organics/Erosion/], Jan. 1, 2001, California Integrated Waste Management Board, 2 pages.

Glass, "U.S. and International Markets for Phytoremediation, 1999-2000", [http://www.chanell.com/dglassassoc/INFO/phy99exc.htm], Jan. 1, 1999, 7 pages, D. Glass Associates, Inc.

Huffman, "Phytoremediation", [http://www.woodrow.org/teachers/bi/1998/bioremediation/], Jan. 1, 1998, 6 pages, WWLPT Biology Institute.

Keating, "Compost Coverage", May 1, 2001, pp. 30-35, Erosion Control.

Keating, "Seeding: Success is all in the Techniques", Jan. 1, 2002, pp. 46 and 48-52, Erosion Control.

Land and Water, "Land and Water", Mar. 1, 2002, 72 pages, Land and Water, Fort Dodge, IA, US.

Lenhart, "The Stormwater Management StormFilter", Jan. 1, 1997, pp. 252-258, Stormwater Management™, US.

Missouri Botanical Garden, "Phytoremediation", [http://www.mobot.org/jwcross/phytoremediation/phytorem_reviews.htm], Jan. 1, 2001, 4 pages, Missouri Botanical Garden.

Rock, "Phytoremediation", Seminar Series on Bioremediation of Hazardous Waste Sites: Practical Approaches to Implementation, Jan. 1, 1998, 8-1 —8-9.

Tyler, "Compost's Next Wave", May 1, 2002, p. 34, Waste Age.

CONTAINMENT SYSTEMS, METHODS, AND DEVICES

This application claims priority to, and incorporates herein by reference in its entirety, the following pending U.S. Patent Applications:

Ser. No. 60/449,415, titled "Netting-Reinforced Turf Systems and Methods", filed 24 Feb. 2003;

Ser. No. 10/208,631, titled "Device, System, and Method for Controlling Erosion", filed 29 Jul. 2002 now U.S. Pat. No. 7,226,240; and Ser. No. 60/392,430, titled "Agricultural Device", filed 28 Jun. 2002.

BRIEF DESCRIPTION OF THE DRAWINGS

Certain of the wide variety of potential embodiments will be more readily understood through the following detailed description, with reference to the accompanying drawings, in which.

DETAILED DESCRIPTION

Certain exemplary embodiments generally relate to devices, systems, and methods, at least some of which can be useful for controlling erosion, retaining sediment, preventing siltation, treating runoff, removing pollutants, remediating environmental damage, protecting plants, bordering play areas, absorbing spills, establishing vegetation, protecting ecosystems, and/or restoring waterways and/or other riparian areas.

Certain exemplary embodiments provide netting and/or mesh-based containment systems, methods, and/or devices. Although the following description is frequently directed to filled mesh tubes, it will also be apparent that this description can generally and/or frequently apply to one or more "sheets" of compost-filled or unfilled mesh netting, and/or one or more sections of netting-backed vegetated mat. Moreover, netting-backed vegetated mat can be combined with filled mesh tubes to create one or more exemplary embodiments.

As used herein, the term "tube" means an elongate member having a longitudinal axis and defining a longitudinal cross-section resembling any closed shape such as, for example, a circle, a non-circle such as an oval (which generally can include a shape that is substantially in the form of an obround, ellipse, limaçon, cardioid, cartesian oval, and/or Cassini oval, etc), and/or a polygon such as a triangle, rectangle, square, hexagon, the shape of the letter "D", the shape of the letter "P", etc. Thus, a right circular cylinder is one form of a tube, an elliptic cylinder is another form of a tube having an elliptical longitudinal cross-section, and a generalized cylinder is yet another form of a tube. A tube can be formed of a mesh material, and can be filled with a filler material.

Certain exemplary embodiments include a system that can include mesh tubes and/or enclosures that are filled with any of a variety of materials, including compost, composted products, mulch, sawdust, soil, gravel, and/or various other organic and/or inorganic substances. Such filled tubes can be filled on-site, which can reduce the transportation cost of the systems. Moreover, such filled tubes can be relatively heavy, thereby resisting and/or avoiding floating away in heavy rain.

Certain embodiments of such filled tubes can be used in a variety of ways such as on an erosion-prone slope, across a small drainage ditch, or surrounding a drain. The tubes can be held in place by their own weight and/or by stakes, which can be driven through the tubes and into the ground. In certain embodiments, attached to the tubes can be additional anchoring mesh, through which anchors can be driven to secure the tubes to the ground.

Certain exemplary embodiments include a method for filling and placing the filled tubes on-site. The tubes can be filled using a pneumatic blower truck, an auger, and/or by hand.

System 1000

Figure 1:
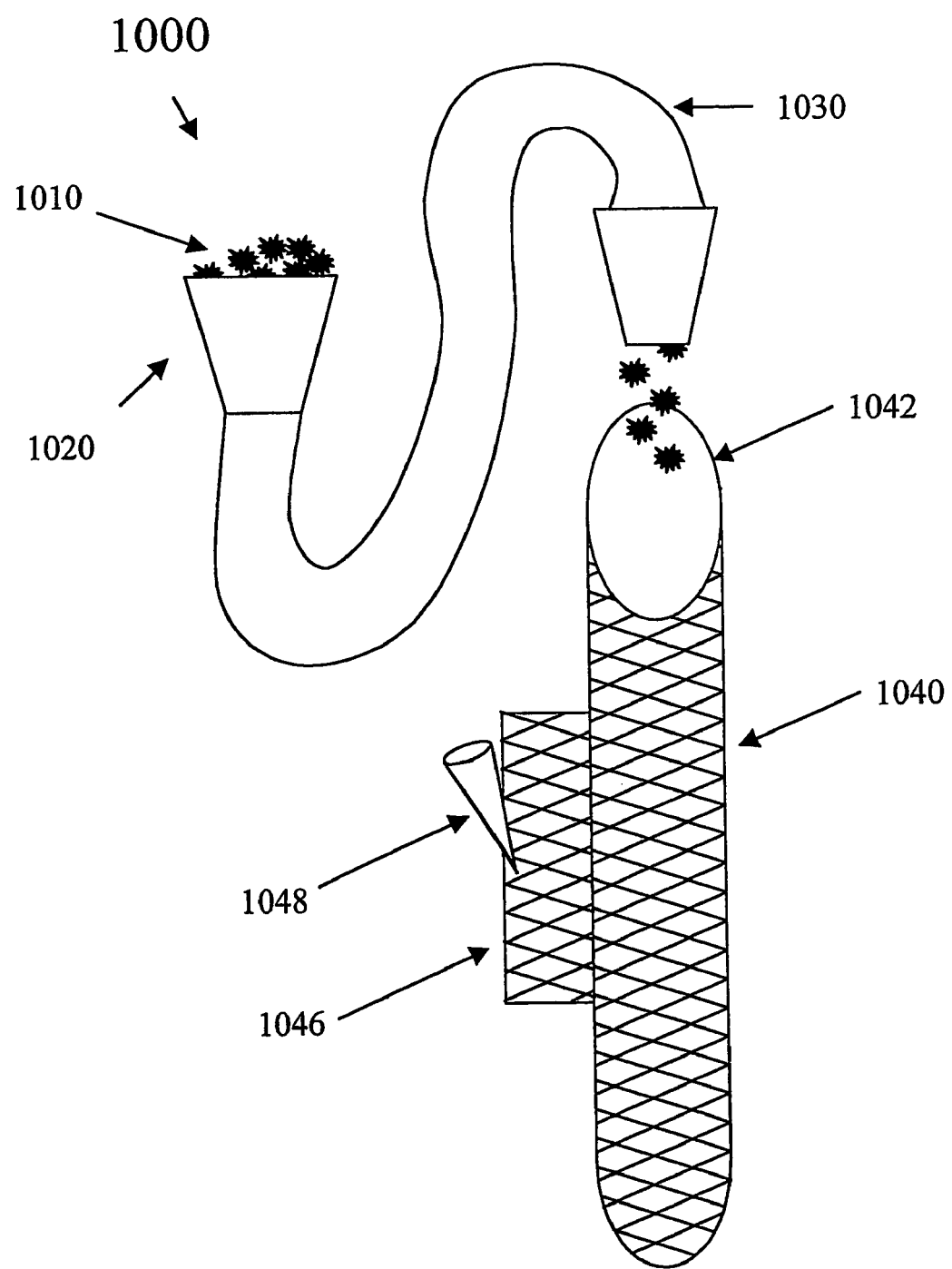
FIG. 1 is a block diagram of an exemplary embodiment of a system 1000.
Figure 2:
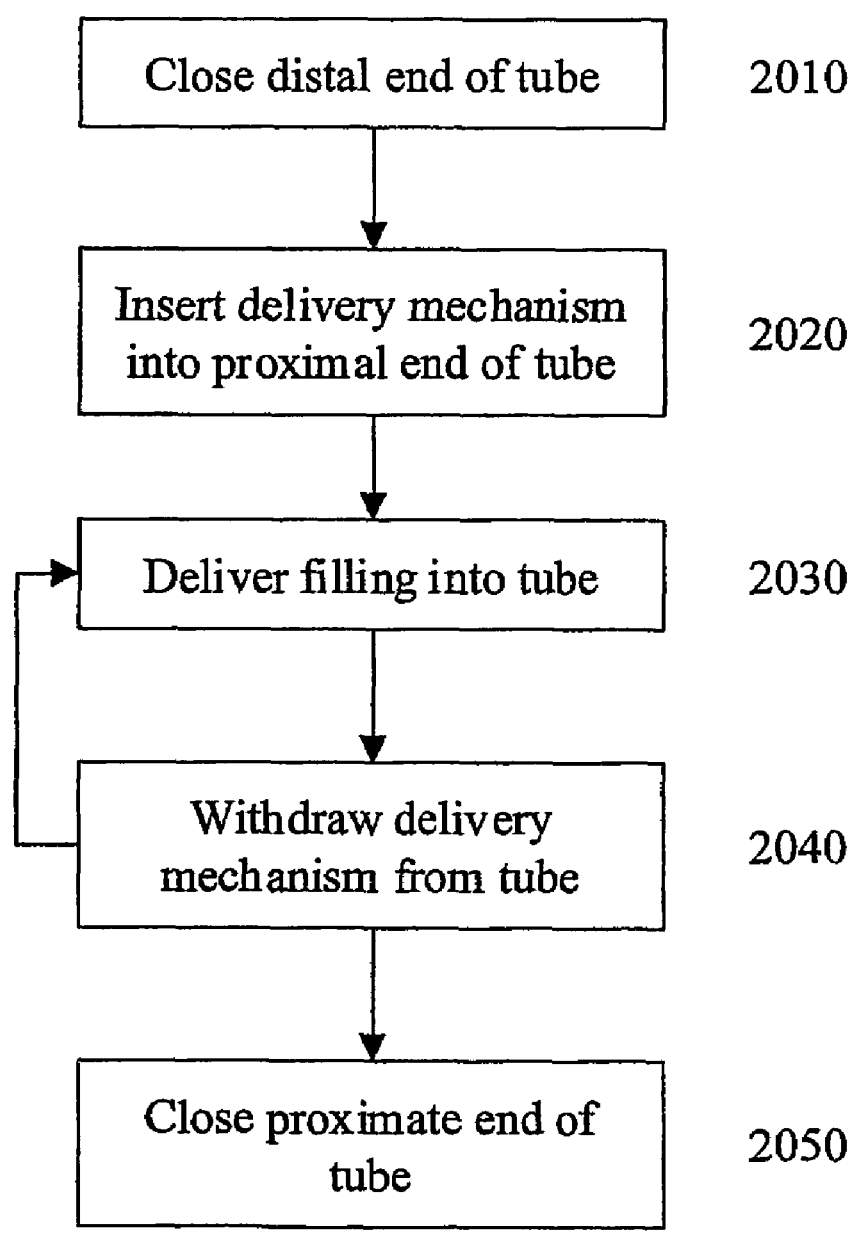
FIG. 2 is a flowchart of an exemplary embodiment of a method 2000.

FIG. 1 is a block diagram of an exemplary embodiment of a system 1000. System 1000 can include a filling 1010, which can be contained in a storage enclosure 1020 and delivered via a delivery mechanism 1030 to a mesh tube 1040 (or a mesh netting).

Filling 1010 can comprise any of a number of materials, including compost, composted organic materials, organic feedstocks, composted products, mulch, wood shavings, lime, clay, pea gravel, gravel, sand, soil, wood chips, bark, pine bark, peat, soil blends, straw, hay, leaves, sawdust, paper mill residuals, wood wastes, wood pellets, hemp, bamboo, biosolids, coconut fibers, coir, wheat straw, rice straw, rice hulls, corn husks, corn, grain, corn stalks, oat straw, soybean hulls, palm wastes, palm leaves, agricultural waste products, manure, wool, hair, sugar cane bagasse, seed hulls, jute, flax, hulls, organic waste, cat litter, activated charcoal, diatomaceous earth, chitin, ground glass, alum, aluminum oxide, alum sludge, iron oxide, iron ore, iron ore waste, ironite, iron sulfate, pumice, perlite, rock fragments, mineral fragments, ion exchange substances, resin, and/or beads, zeolites, plant seeds, plugs, sprigs, spores, mycorrizhae, humic acid, and/or biological stimulants, microorganisms, microflora, rhizospheres, mycospheres, and/or ecosystems, etc. Filling 1010 can comprise a base material selected from the preceding list, and one or more additives, selected from the preceding list. Any such additive can be added to and/or blended with the base material prior to, during, and/or after filling of the tube, and/or can be added to the tube prior to and/or during the filling of the tube with the base material.

Filling 1010 can comprise a substrate, such as compost, mulch, gravel, bark, fibers, etc., which has been inoculated with a fungus or other microorganism, and/or upon which a fungus and/or other microorganism has been grown. Filling 1010 can comprise a material having a predetermined absorption and/or adsorption capability.

Certain embodiments of filling 1010, such as compost, can provide treatment of runoff water by physically straining and/or entrapping the runoff; biologically treating, binding, remediating, and/or degrading unwanted, harmful, and/or polluting substances; and/or chemically binding and/or degrading certain pollutants. Such runoff, substances, and/or pollutants can include metals (e.g., cadmium, chromium, cobalt, copper, lead, mercury, and/or nickel,), metalloids, (e.g., arsenic, antimony, and/or silicon, etc.), nonmetals (e.g., sulfur, phosphorus, and/or selenium, etc.), hydrocarbons and/or organic chemicals (such as 2,4,6-trinitrotoluene), nutrients (e.g., fertilizer, nitrates, phosphates, sewage, and/or animal waste, etc.), and/or pathogens (e.g., *e. coli, staphylococcus*, rotovirus, and/or other bacteria, protozoa, parasites, viruses, and/or prions, etc.), etc.

Certain embodiments of filling 1010, such as compost, can be weed seed-free, disease-free, and/or insect-free, and can be derived from a well-decomposed source of organic matter. Certain embodiments of such compost can be free of refuse, contaminants, and/or other materials toxic and/or deleterious to plant growth. In certain embodiments, the compost can have a pH that measures anywhere between approximately 5.0 and approximately 8.0, including all values therebetween, and including all sub-ranges therebetween, such as for example, approximately 5.4 to approximately 7.6, etc. Certain embodiments of such compost can be produced according to an aerobic composting process meeting 40 CFR 503 (or equivalent) regulations. Certain embodiments of such compost can have a moisture content of less than 60%.

In certain embodiments, such as perhaps those involving water filtration, the particle size of the compost can conform to the following: 99% passing a 1 inch sieve, 90% passing a 0.75 inch sieve, a minimum of 70% greater than a 0.375 inch sieve, and/or less than 2% exceeding 3 inches in length. The mean, median, minimum, and/or maximum size of the compost can be varied according to the application. For example, if increased filtering is desired, or if no sediment is trapped upstream of the tube, the size of the compost can be decreased, or better ground contact can be attempted. Conversely, if too much water is retained in, for example, an erosion-prevention application, the size of the compost can be increased.

In certain embodiments, such as those use for creating a plant growing environment, the minimum particle size can be eliminated, thereby effectively ensuring that some fines will remain that can help vegetation become established.

Certain embodiments of compost can be comprised of approximately 100 percent compost, i.e., pure compost. Certain embodiments of compost, such as those used for sediment control, can contain less than a predetermined dry weight of inert, foreign, and/or man-made materials, that amount selected from a range of about 0.1% to about 20%, including every value therebetween, such as for example about 0.25, 0.5, 0.749, 1.001, 1.5, 2, 4.936, 7.5, 9.9999, 15, etc. percent, and including every sub-range therebetween, such as for example about 0.6 to about 10 percent, etc. Certain embodiments of compost can have predetermined materials added thereto, such as any of those filling materials and/or plant materials listed herein.

For example, certain embodiments of filling 1010 can include, support, and/or encompass one or more microorganisms, microflora, rhizospheres, mycospheres, and/or ecosystems that can biologically and/or chemically break-down, decompose, degrade, bind, and/or filter unwanted pollutants in the water that flows therethrough.

Certain embodiments of filling 1010 can include entities such as colonies, colony forming units, spores, seeds, bulbs, plugs, sprouts, sprigs, and/or seedlings of microorganisms, bacteria, fungi, and/or plants. As these entities become established, these entities can provide numerous beneficial functions.

For example, certain living entities can assist with remediating the environmental impact of the expected effluent. For example, plants commonly called cattails, reeds, rushes and/or skunk cabbage can be useful for treating certain types of sewage. Thus, for example, a potential wetland area downstream of a septic field could be surrounded and/or filled with a filled tubes seeded with an appropriate variety of plant.

As another example, certain plants, such as mustard, can be useful for absorbing particular heavy metals. As yet another example, the root systems of plants growing from a filled tube can serve to anchor the filled tube into the adjacent soil. This anchoring can serve to prevent run-off from moving or washing away the filled tube.

As a further example, certain embodiments of the filled mesh tube can eventually provide plants that can improve the aesthetic image of the filled tube. Thus, rather than permanently presenting a black, brown, or gray-colored compost-filled tube, a sprouted filled tube can present, for example, blooming flowers, groundcovers, vines, shrubs, grasses (such as turn seed, annual rye, crown vetch, birds foot trefoil, and/or fescues), and/or aquatic plants, etc.

As another example, via a technique called mycoremediation, certain fungi and/or fungal components, such as macrofungi (including mushrooms commonly referred to as shiitakes, portabellas, criminis, oysters, whites, and/or morels), white-rot fungi (such as *P. chrysosporium*), brown-rot fungi, mycelium, mycelial hyphae, and/or conidia, can be useful for decomposing and/or breaking down pollutants and/or contaminants, including petroleum, fertilizers, pesticides, explosives, and/or a wide assortment of agricultural, medical, and/or industrial wastes. Certain of such fungi and/or fungal components are available from Fungi Perfecti of Olympia, Wash.

In certain embodiments, a microbial community encompassed within the filling of the mesh tube can participate with the fingi and/or fungal components to break down certain contaminants to carbon dioxide and water. Certain wood-degrading fungi can be effective in breaking down aromatic pollutants and/or chlorinated compounds. They also can be natural predators and competitors of microorganisms such as bacteria, nematodes, and/or rotifers. Certain strains of fungi have been developed that can detect, attack, destroy, and/or inhibit the growth of particular bacterial contaminants, such as *Escherichia coli* (*E. coli*).

Certain embodiments of the filling can include one or more fertilizers, flocculants, polymers, chemical binders, and/or water absorbers, etc., any of which can be selected to address a particular need and/or problem, such as to fertilize the growth of a predetermined plant species and/or to bind a predetermined chemical. For example, the filling can include a predetermined quantity of iron ore powder, which can be used to bind phosphorus.

Storage enclosure 1020 can at least partially surround filling 1010, and can be a vessel, tank, hopper, truck, and/or pile, etc. Delivery mechanism 1030 can be a hose, tube, pipe, duct, and/or chute, and can include a mechanical and/or pneumatic component, such as an auger, vibrator, and/or fan, etc. for biasing filling 1010 toward and/or into mesh tube 1040 (or over an approximately flat mesh netting, not shown). Delivery mechanism 1030 can provide, meter, blend, and/or mix two or more components of filling 1010 prior to and/or during the filling of mesh tube 1040.

Moreover, delivery mechanism 1030 can be replaced with a manual approach, whereby a human places filling 1010 into mesh tube 1040 (and/or a mesh netting, not shown). Delivery mechanism 1030 can include a nozzle, reducer, and/or hose adapter that allows a standard hose (such as a hose having an approximately 4 or 5 inch diameter) to fill a larger and/or smaller diameter mesh tube.

Mesh tube 1040 (and/or a mesh netting, not shown) can be fabricated from a flexible netting material, which can be woven, sewn, knitted, welded, molded, and/or extruded, etc. One source of netting material is Tipper Tie-net of West Chicago, Ill.

The netting material can be biodegradable, such as cotton, a natural fiber, UV-sensitive plastic, and/or biodegradable polymer, potentially formed from a plastic and/or starch, and in certain embodiments, can biodegrade at a predetermined rate of biodegradation. For example, the netting material can be selected to biodegrade within about 1 month to about 3 years, including every value there between, such as about 3, 4.69, 6.014, 9, 11.98, 15, 16.4, 18, 23.998, 30.1, and/or 35, etc. months, and including every sub-range there between, such as from about 6.1 to about 12.2 months, etc.

Alternatively, all and/or any portion of the netting material can resist biodegradation. The netting material can be fabricated from, plastic, UV-inhibited plastic, polyester, polypropylene, multi-filament polypropylene, polyethylene, LDPE, HDPE, rayon, and/or nylon. Thus, when a tube is installed, the netting material can have a non-degradable portion that can be oriented downwards, so that the reinforcement provided by the netting remains, and a degradable portion that can be oriented upwards.

The netting material can be of any diameter and/or thickness, ranging from approximately 0.5 mils to approximately 30 mils, including all values therebetween, including approximately 0.5, 0.75, 1, 2, 3, 4, 5, 6, 7, 8, 9, 10, 12, 15, 18, 20, 22, 25, 28, and/or 30 mils, and including all sub-ranges therebetween, such as for example, from approximately 1.1 mils to approximately 26.36 mils, etc. The netting material can be in any available mesh size (mesh opening), from a mesh as small as that of women's pantyhose, and including a nominal mesh opening of approximately: 0.001, 0.005, 0.010, 0.025, 0.050, 0.0625, 0.125, 0.25, 0.375, 0.5, 0.625, 0.75, 0.875, 1.0, 1.125, 1.25, 1.375, and/or 1.5, etc. inches, including all values therebetween, and including all sub-ranges therebetween, such as for example, from approximately 0.0173 inches to approximately 0.7 inches, etc. The netting material can have any mesh opening pattern, including diamond, hexagonal, oval, round, and/or square, etc. Mesh tube 1040 (and/or "sheets" of mesh netting, not shown) can be fabricated in standard lengths, such as any of approximately 1, 2, 3, 4, 5, 6, 7, 8, 9, 10, 15, 20, 25, 50, 75, 100, 125, 150, 200, 250, 300, 400, and/or 500, 1000, 5000 etc. foot lengths, including all values therebetween, and including all sub-ranges therebetween, such as for example, from approximately 17.85 feet to approximately 292 feet, etc. Any number of mesh tubes 1040 can be coupled together in a process called 'sleeving', to form a continuous mesh tube (and/or mesh netting sheet, not shown) of any size, including lengths of as long as 1000, 2000, 3000, 4000, 5000, 7500, and/or 10,000, etc. or more feet, including all values therebetween, and including all sub-ranges therebetween, such as for example, from approximately 1243 feet to approximately 14,452 feet, etc. Thus, certain lengths of filled mesh tubes can be intended to be portable, and other lengths of filled mesh tubes can be intended to be immobile.

Mesh tube 1040 (and/or one or more "sheets" of mesh netting, not shown) can be filled (and/or covered) completely or incompletely. When filled completely, a longitudinal cross-section of mesh tube 1040 can be generally curvilinear in shape, such as a circle or a non-circle, such as an oval (which generally can include a shape that is substantially in the form of an obround, ellipse, limaon, cardioid, Cartesian oval, and/or Cassini oval, etc.). Moreover, the cross-section can have a simple, closed, non-circular, curvilinear and/or partially curvilinear shape. For example, the cross section can be shaped substantially like the letter D, rotated such that the flat portion is parallel with and/or adjacent a surface supporting mesh tube 1040. As another example, the cross section can be generally shaped as a polygon, such as a triangle, rectangle, square, hexagon, etc., rotated such that a flat side is parallel with and/or adjacent a surface supporting mesh tube 1040. As still another example, the cross-section can have any substantially closed shape, provided that mesh tube 1040 presents at least one substantially flat side that can be positioned substantially parallel and/or adjacent a surface supporting mesh tube 1040. Placing a flat side downward and/or against a supporting surface can help maintain a position of mesh tube 1040, thereby potentially preventing rolling, sliding, and/or other dislocation.

Mesh tube 1040 can have a major cross-sectional width (i.e., major diameter and/or other largest cross-sectional dimension) ranging from approximately 3 inches to approximately 30 inches, including approximately 3, 4, 5, 6, 8, 10, 12, 14, 16, 18, 20, 22, 24, 26, 28, and/or 30, etc. inches, and including all sub-ranges therebetween, such as for example, approximately 4.17 inches to approximately 17.9 inches, etc. Thus, the ratio of the length of mesh tube 1040 to its major width can be approximately 5, 6, 7, 8, 9, 10, 15, 20, 25, 30, 35, 40, 45, 50, 75, 100, 150, 200, 300, 400, and/or 500, etc. or larger, and including all sub-ranges therebetween, such as for example, from approximately 21 to approximately 183, etc.

Mesh tube 1040 can have opposing longitudinal ends, the end nearest the delivery device called the proximal end 1042 and the end furthest the delivery device called the distal end 1044. Distal end 1044 can be closed and/or sealed prior to the delivery of filling 1010 into mesh tube 1040. After delivery of filling 1010 into mesh tube 1040, proximal end 1042 can be closed and/or sealed. The method of closing and/or sealing either of ends 1042, 1044 can include knitting, sewing, folding, welding, stapling, clipping, clamping, tying, knotting, and/or fastening, etc.

Similarly, sheets of mesh netting can be closed, sealed, and/or attached via knitting, sewing, folding, welding, stapling, clipping, clamping, tying, knotting, and/or fastening, etc.

Attached to mesh tube 1040 (and/or one or more "sheets" of mesh netting, not shown) can be an anchoring device 1046, such as a flap fabricated from mesh netting, such as that used to fabricate mesh tube 1040. Such a flap can range in dimensions with the size of the tube and/or the expected forces that might bear upon the tube. For example, an 8-inch diameter tube might have two 4-inch wide flaps that are made from the same mesh material as the tube, and that extend along the entire length of the tube. Stakes 1048 can be driven through each of these flaps and into the underlying substrate. This can secure both sides of the tube, and can create additional stability for the tube.

Alternatively, anchoring device 1046 can be fabricated from any fabric. In another alternative embodiment, anchoring device 1046 can comprise a string, rope, cable tie, sod stakes, re-bar, wood stakes, and/or wire, etc. attached to mesh tube 1040 (and/or one or more "sheets" of mesh netting, not shown).

Alternatively, anchoring device 1046 can comprise an unfilled end of mesh tube 1040, which can be secured via stakes 1048 to, for example an underlying and/or adjacent support surface (e.g., soil, ground, sand, pavement, etc.).

Mesh tube 1040, one or more "sheets" of filled or unfilled mesh netting (not shown), and/or one or more sections of harvested netting-backed vegetated mat (not shown) can be attached to a geo-surface, such as the ground, soil, sand, silt, sod, earth, dirt, clay, mud, peat, gravel, rock, asphalt, concrete, pavement, a streambed, a stream bank, a waterway bank, a pond bank, a ditch, a ditch bank, and/or a slope, etc. The means for attaching mesh tube 1040 can include an attachment device 1048 that protrudes through mesh tube 1040 and/or anchoring device 1046. As an example, an attachment device 1048, such as a metal or wooden stake, could be hammered through a mesh-anchoring device 1046, such as a mesh flap, and into a ditch bed to secure a mesh tube or vegetated mat across the flow path of a ditch to form a "ditch check". Such a ditch check can slow water flow, encourage the deposition of silt and/or sediment, and/or potentially encourage the growth of plants whose root systems can further discourage run-off and/or erosion.

In certain embodiments, a plurality of filled mesh tubes 1040 can be installed adjacent each other and parallel an expected flow of water in a channel or potential channel, such as a stream bed, gully, swale, ditch, and/or trench, etc. Such tubes can form and/or line a floor and/or side walls of the channel, thereby resisting erosion of the channel.

In certain embodiments, an installed filled mesh tube and/or one or more sections of harvested netting-backed vegetated mat (not shown) can at least partially impede the flow of water into a storm water basin inlet, thereby potentially preventing clogging of the piping that drains the basin and/or filtering the water that enters the basin.

In certain embodiments, multiple mesh tubes 1040 can be stacked, for example following the contour of a steep slope, thereby forming a wall that can function to retain soil and reduce surface erosion. In certain embodiments, mesh tubes located higher up the wall can be of smaller cross-sectional width than those lower in the wall. Uphill from the tubes can be placed and/or backfilled, in some cases pneumatically, a geo-surface material and/or media, such as soil, mesh netting-back turf, sod, earth, dirt, clay, mud, peat, gravel, rock, and/or a filling material, as described earlier. Such a geo-surface material can be used to restore an eroded zone, such as when a stream bank has eroded beneath existing trees, exposing the trees and making them vulnerable to toppling. By installing multiple mesh tubes as a form of retaining wall, and back-filling with suitable material for supporting the tree and/or sustaining the tree's previously-exposed roots, the stream bank can be restored and the tree can potentially be saved.

Method 2000

Certain exemplary embodiments can employ a method 2000 for forming a storm water control system, erosion control system, sediment control system, silt reduction system, soil retention system, water protection system, water filtration system, pollution remediation system, plant protection system, plant initiation system, and/or erosion remediation system.

Method 2000 can include numerous activities, of which no particular activity or particular sequence of activities is necessarily required. For example, at activity 2010, a distal end of a mesh tube can be closed and/or sealed, such as by typing a knot in the tube. At activity 2020, a delivery mechanism, such as a blower hose or an auger outlet, can be inserted into an open proximate end of the mesh tube. Alternatively, mesh tube can be filled from an outlet of a chipper, shredder, chopper, and/or straw blower. Alternatively, a mesh tube having open ends can be slid over a blower hose, a proximate end of the tube potentially slid over a hose attachment, and a distal end of the tube closed and/or sealed prior to filling.

At activity 2030, a filling can be discharged from the delivery mechanism into the mesh tube. The filling can be supplied to the delivery mechanism by, for example, a blower truck that contains a supply of the filling and is coupled pneumatically to the blower hose. Such blower trucks can include a pneumatic blower mounted on a portable truck that can be capable of reaching remote areas. A typical blower truck can blow filler down a hose of up to 700 feet in length or more, and can be obtained from Express Blower Inc. (Cincinnati, Ohio), Finn (Cincinnati, Ohio), and/or Peterson Pacific (Eugene, Oreg.). A typical blower truck can fill 8 or 12" diameter mesh tubes at a rate of from about 600 to about 1000 feet or more per hour, including all values and all subranges therebetween. The blower truck can be calibrated for proper airflow to filler ratio, thereby preventing the mesh tube from being under or over filled. Water can be added to the filler to reduce dust. During filling, the length of the mesh tube can "shrink" by up to 20 percent, due to an increase in the width of the mesh tube.

In certain embodiments, the blower hose can be terminated by a cone or funnel-like attachment (such as a "diffuser" that slows the velocity of the filling) comprising a first proximate end having a longitudinal cross-sectional width that allows the terminal end of the hose to fit around and/or within the attachment. The hose attachment can comprise a second distal end having a longitudinal cross-sectional width that can approximately match the pre-filled nominal width and/or the desired cross-sectional shape, as described herein (e.g., circular, non-circular, curvilinear, partially curvilinear, polygonal, having at least one flat side, etc.), of the unfilled and/or filled mesh tube. The proximate end of the hose attachment can be a permanent attachment or a temporary attachment that is hooked, tied, screwed, taped, and/or otherwise attached to the blower hose.

The unfilled mesh tube can be slid over the attachment and hose, with only a distal end of the tube extending beyond the attachment. The distal end of the unfilled mesh tube can be tied, stapled, sealed, and/or otherwise closed. As filler begins to enter the distal end of the mesh tube, additional lengths of unfilled mesh tube can be fed slowly off the end of the hose and the attachment, keeping the filling portion of the mesh tube taught, and allowing the mesh tube to "walk" itself off of the hose. Alternatively, the hose can "back out" of the mesh tube. In certain embodiments, when properly filled, the mesh tubes can be rather fill, creating a tightly stretched, fully expanded material that is difficult to pinch. When the proximal end of the mesh tube is reached, blowing can be stopped and approximately 8 inches, or an appropriate length, of unfilled mesh tube can be left for tying off.

In certain embodiments, the blower hose can be terminated by an attachment that applies a shape to the mesh tube and/or filling. For example, the attachment can have a cross-sectional shape in the form of a circle, non-circle, oval, a polygon (e.g., a triangle, square, etc.), etc. Thus, the cross-sectional shape of the filled mesh tube can take on, resemble, and/or be substantially influenced by the cross-sectional shape of the attachment, which might resemble the letter "D", rotated such that the flat side is facing downward. The use of such an attachment can help maximize contact between the mesh tube and the supporting surface (e.g., ground).

As another example, a hopper can drop the filling into an auger that conveys the filling into the mesh tube. Activity 2030 can occur anywhere. That is, the mesh tube can be filled off-site ("ex-situ") and/or on-site ("in situ"), which can include at the ultimate desired location for the filled tube.

At activity 2040, the delivery mechanism can be withdrawn from the mesh tube when the mesh tube has been filled to the desired level. At activity 2050, the proximate end of the mesh tube can be closed and/or sealed. Alternatively, the filled tube can be attached to a second tube in a process called sleeving, in which one tube overlaps the other by anywhere from about 1 to about 4 feet, thereby effectively extending the length of the first tube. If needed, the two tubes can be attached together using, for example, twist ties, zip ties, stakes or the like. Then the filling process can continue. Additional tubes can be further attached to form a continuous tube of any desired length.

In certain embodiments, a small amount of filler material can be applied adjacent, outside of, and/or upstream from the filled tube, to potentially resist water from flowing under and/or undercutting the filled tube. In certain embodiments, the filled tube can be stepped on or otherwise compressed to achieve better ground contact.

Cropping Applications

Certain exemplary embodiments provide tubular mesh netting materials containing growing media useful for crop production.

Certain exemplary embodiments provide a cropping system that utilizes specialized sock filling equipment to fill mesh tubes as well as certain techniques for row spacing, fertilizing, irrigation, planting of plugs, weed control, seeding rates, etc.

An embodiment of such a cropping system can use a mesh tube that can be filled with one or more chosen growing media, including composted products. The mesh or netting material can be filled with an auger, pneumatically, and/or with other devices to create a growing "roll", which can by installed to simulate a raised bed garden. In this manner, certain embodiments of the cropping system can allow elevation of roots and can be combined with drip irrigation and/or fertigation (i.e., fertilization via irrigation) techniques.

Figure 6:
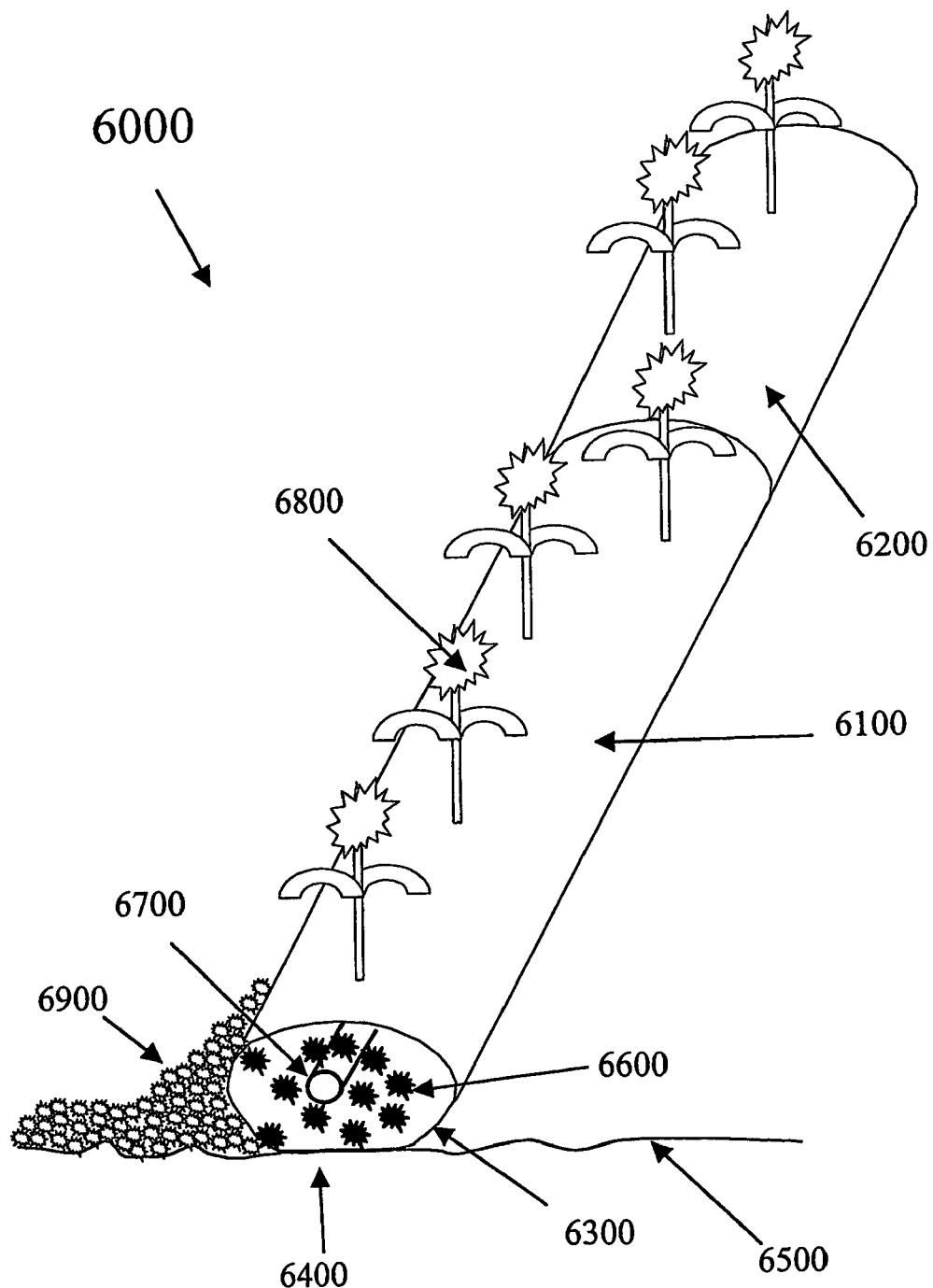
FIG. 6 is a perspective view of an exemplary embodiment of a cropping system 6000.

FIG. 6 is a perspective view of an exemplary embodiment of a cropping system 6000. Among its many potential components, system 6000 can comprise a first mesh tube 6100 that is coupled, attached, or placed adjacent to a second mesh tube 6200. A cross-sectional shape 6300 of at least first mesh tube 6100 can be at least partially curvilinear and non-circular, and can have a substantially flat side or bottom 6400, which can be supported by the ground or any other support 6500, such as pavement, concrete, sand, mulch, a table, patio, landscape timbers, a deck, and/or turf, etc.

At least first mesh tube 6100 can contain a filling 6600 and can contain an irrigation hose (a.k.a., tube, line, pipe, etc.) 6700 that can deliver water, nutrients, fertilizer, pest treatments, etc., via continuous, intermittent, and/or drip irrigation to plants 6800 growing from and/or adjacent the mesh tube. Irrigation hose 6700 can be positioned anywhere within and/or adjacent tube 6100, including at approximately the center, top, and/or another predetermined location, including along an external surface of the mesh tube. Moreover, any outlets of hose 6700 can be oriented in any predetermined and/or random direction.

A landscaping material 6900, such as mulch, wood chips, and/or straw, etc., that serves, for example, a walkway, playground, landscaping bed, etc. can be applied against an outside surface of at least first mesh tube 6100, which can serve to physically constrain, border, and/or resist the dispersal of landscaping material 6900. Because mesh tube 6100 can be filled with a relatively soft filler, the likelihood of human injury from contact with mesh tube 6100 is relatively low. Thus, mesh tube 6100 can provide a relatively soft, non-injuring border for such areas as playgrounds.

In certain embodiments, at least first mesh tube 6100 can serve as a portable planter. To irrigation hose 6700 can be connected a garden hose for watering of the portable planter, which can be useful for patio gardening of plants such as tomatoes, peppers, beans, flowers, herbs, and/or other plants.

In certain embodiments, at least first mesh tube 6100 can be installed adjacent to, and/or supported by, a landscape architectural element, such as for example, an: archway, arbor, pergola, rafter, purlin, column, balustrade, trellis, post, pedestal, statute, ornament, planter, and/or roof, etc. Thus, such a landscape architectural element can serve as support 6500.

Using certain embodiments of mesh tubes and/or the cropping systems can allow a crop farmer to continue cultivation of the soil between the rows of mesh tubes with mechanical devices for weed control and/or to plant these areas in turf that can be mowed and/or maintained. This system can allow crop farmers to grow within an all-organic system, which can raise a market value of crops produced.

Using certain embodiments of mesh tubes and/or the cropping systems can be installed substantially below grade, at grade, and/or above grade. For example, a nursery and/or crop farmer might install an irrigated filled mesh tube containing plants above grade. When it is time to harvest and/or transfer a portion of the plants in the tube, a shovel, spade, or other tool could be used to cut through the mesh tube's netting and irrigation hose on either side of the desired plant(s), thereby separating the desired plant(s) from the remaining row of plants.

Certain embodiments of the mesh tubes can be biodegradable and can alleviate problems of clean-up when rows or field are replanted with other crops. The degradation of certain embodiments of mesh tubes can be customized to varying times, depending on the cropping system used. For instance, a mesh tube can be manufactured to last a full year in the field or it can degrade in six months or less. Whatever the time frame, materials can be manufactured to meet the degradation time frame.

Certain embodiments of the cropping system can employ specialized equipment, which can fill the mesh tubes, and/or a roller that can flatten the socks and/or compress them into an elongated shape having, for example, a non-circular, oval, rectangular, triangular, and/or closed polygonal cross-section. Certain of these forms, such as the obround, elliptical, rectangular, triangular, etc., and other forms having a flat-, pseudo-flat-, or flattenable-bottomed cross-section, can provide a firm seed bed for seeds or plugs to be inserted into the mesh tube via either a direct seeder which penetrates the mesh netting with a punch or an awl-like device which can create a planting hole for pre-started plugs. Other options can include the insertion of bare root plants and/or live cuttings, which can root into the media contained within the mesh tube. Still other options can include using a process called "live staking", which can involve inserting a freshly cut twig or branch through the netting soon after cutting. Such cuttings can have the ability to grow without requiring rooting times. Exemplary plants include willows, dogwoods, etc.

Certain plant diseases can be controlled using an integrated pest management approach with certain embodiments of the cropping system. Since soil-borne diseases can be caused by wet conditions and/or poorly drained soils, the ability of certain embodiments of the system to dissipate water can reduce the prevalence of such diseases. Additionally, certain embodiments of the cropping system can provide disease control via its composted materials.

Moreover, certain embodiments of the mesh tubes can include traditional, "natural", and/or organic chemicals, such as herbicides, pesticides, and/or fertilizers, etc., and even bacteria, fungi, and/or insects, etc., combined with the compost. Other physical items can be added to assist in insect control, including, but not limited to, diatomaceous earth, chitin, ground glass, and/or other rock or mineral fragments.

Thus, certain embodiments of mesh tubes and/or the cropping system can provide any one or more of the following:

Mesh netting that can be filled (in any manner) with compost, blended soils, soils, and/or other growing medias for the production of crop agriculture;

Netting materials that can be biodegradable, tubular in design, and/or used for agricultural production in row crops;

Cotton mesh material that can be biodegradable, for containment of a growing media in relation to crop agriculture;

A combined system of a mesh tubes containing growing media inoculated with specialized disease resisting agents;

A mechanism to provide other innoculants and/or soil additives for a cropping system which may or may not be involved in crop agriculture;

A method for portably providing mesh tubes to remote locations;

A method for filling mesh tubes at remote locations;

A method for using mesh tubes as containment systems for growing plugs, plants, and/or seeds in an agricultural setting;

A method for using mesh tubes as containment systems for growing plugs, plants, and/or seeds in a garden setting;

A method for using mesh tubes to contain a growing medium for plugs, plants, and/or seeds;

A method for using mesh tubes as a wholesale plant distribution mechanism;

A method for using mesh tubes as a retail plant distribution mechanism;

A method for using mesh tubes as a retail/wholesale distribution mechanism for sales of small growing systems capable of being shipped and/or marketed;

A method for using mesh tubes as containment systems for wetland plants; and/or

A method for using mesh tubes as a treatment mechanism for agricultural runoff.

Certain embodiments of mesh tubes and/or the cropping system can allow portability that is unavailable in many other products. Future evolutions and product introductions may include patio planters, edging, wetland plantings, and other choices that may be pre-seeded and sold at various discount garden centers or mass merchandisers.

Finally, since the compost and/or the components which can make-up biodegradable netting (e.g., netting formed from cotton, and/or corn, etc.) are annually renewable, the biobased appeal for mesh tubes and the system can yield favorable attention from the USDA and other audiences currently placing emphasis on bio-based or sustainable programs.

Vegetated Mat Applications

Exemplary embodiments can provide methods for growing vegetated mats via rolling out plastic sheeting over a growing platform, rolling out a mesh netting material over certain portions of the plastic sheeting, and applying compost and seed and/or other plant material over the netting. After approximately 4 to 6 weeks of irrigation in appropriate growing conditions, the resulting rollable netting-backed and/or netting-reinforced vegetated mat can be harvested. The vegetated mat is not necessarily grown on and/or in traditional soil (i.e., the top layer of the earth's surface, typically comprising a miscellaneous mix of rock, mineral particles, and organic matter). That is, in certain embodiments, the mat can be grown on a "non-soil" growing platform and/or can be grown "soil-lessly" with and/or in a non-soil growing medium, such as compost. Thus, below-grade cutting is not necessarily required for harvesting the growing vegetation.

Instead, the vegetated mat can be simply rolled up off of the plastic sheeting, placed on a pallet, and shipped to an installation site.

Exemplary embodiments can provide a non-soil platform grown, rollable, netting-backed and/or netting-reinforced, vegetated mat that is lightweight, soil-less, and/or relatively disease resistant. In certain embodiments, the vegetated mat can be staked into place like traditional sod, but because the vegetated mat can be a one hundred foot or longer strip, the chances of it moving can be slim. In certain embodiments, the vegetated mat system can immediately resist erosion while the vegetated mat system roots in.

Via certain exemplary embodiments of a system and/or method, several crops of vegetated mat can be harvested per year on a given growing area. Crops can be based on annually renewable, recycled, organic, bio-based, locally made, organic and natural products (compost), which means costs for shipping to market can be reduced because a number of locally available vegetated mat technicians can be trained to make the netting-back and/or netting-reinforced vegetated mat locally to reduce shipping of the vegetated mat over long distances. Typical crops can require about 6 weeks or less from planting to harvest. This means a given platform area can turn from about 1 to about 10 (including all values and sub-ranges therebetween) or more crops annually, even in a temperate climate range.

Figure 3:
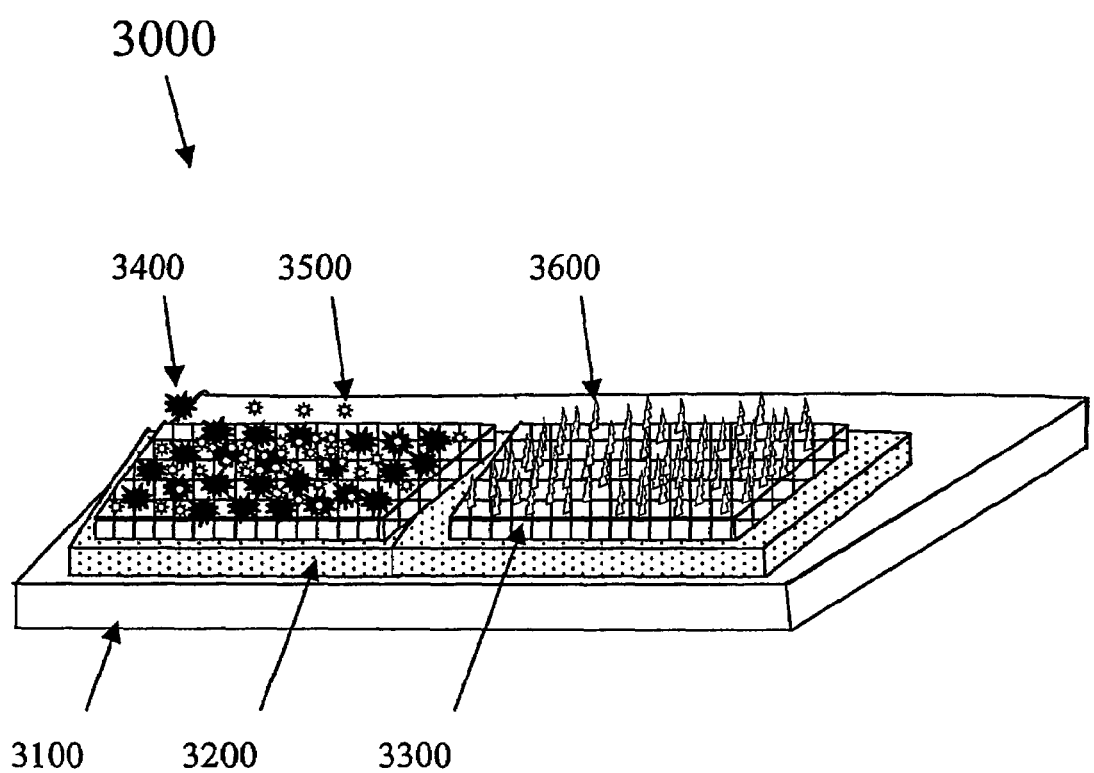
FIG. 3 is a perspective view of an exemplary embodiment of a netting-backed vegetated mat system 3000.

FIG. 3 is a perspective view of an exemplary embodiment of a netting-backed vegetated mat system 3000. Among other things, system 3000 can comprise a non-soil vegetated mat growing platform 3100, sheeting material 3200, netting 3300, compost 3400, seed 3500, seedlings 3600, and transplantable vegetated mat 3700.

Vegetated Mat Growing Platform 3100

It should be noted that soil is not required to either grow and/or to support exemplary embodiments of the vegetated mat. In fact, parking lots, asphalt, pavement, concrete, gravel, dry streambeds, hard-packed clay, sand areas, beaches, mulched surfaces, brownfields, greenhouse tables, or even an existing vegetated mat can be used as a growing platform on which to place the plastic sheeting upon which to grow vegetated mats. In extreme climates where heat is an issue, care can be taken in the timing of the seeding to make sure that the tender seedlings, sprouts, etc. of the vegetated mat do not overheat in the sun. This can be a particular concern on blacktop. When white plastic sheeting is used, however, cooler vegetated mat platform temperatures can be created. Moreover, exemplary embodiments of the vegetated mat system do not necessarily require or cause any significant removal of soil during harvesting, thereby avoiding removal of valuable minerals and/or organic matter from the underlying platform. Exemplary embodiments of the vegetated mat system can weigh about ½ the weight of traditional sod.

Sheeting 3200

Any standard (e.g., generic) nursery grade plastic sheeting can be used, in any color, including white, gray, black, etc. The thickness of the sheeting can be from approximately 0.05 mils to approximately 20 mils, including all values therebetween, such as approximately 1.02, 2.33, 3, 4, 5, 6.17, 7.44, 8, 9, 10, 12.1, 15, 17.2, etc. mils, and including all sub-ranges therebetween, such as for example, approximately 0.11 mils to approximately 16 mils, etc. In certain embodiments, small drain holes can be provided in the sheeting, and/or can be created in the sheeting such as via rolling a spike roller across the sheet. The drain holes can be from approximately 0.1 millimeters to approximately 2 millimeters, including all values therebetween, such as approximately 0.101, 0.251, 0.3, 0.4, 0.5, 0.602, 0.749, 0.8, 0.9, 1.0, 1.19, 1.5, 1.75, etc. millimeters, and including all sub-ranges therebetween, such as for example, approximately 0.2 millimeters to approximately 1.73 millimeters, etc. In certain embodiments, even smaller drain holes can be provided. In certain embodiments, the drain holes can be sized to be smaller in width than roots of the seedlings.

Netting 3300

Exemplary embodiments of the vegetated mat system can use a netting having a number of openings and/or sizes. An average, median, and/or mode for the mesh opening size can be selected from approximately ⅛ inch to approximately 3 inches, and all values therebetween, including for example approximately 0.15, 0.24, 0.5, 0.76, 1.01, 1.5, 2.26, etc., and including all sub-ranges therebetween, such as for example, approximately 0.2 inches to approximately 0.73 inches, etc. These openings can be of any shape, including diamond, square, round, octagon, hexagonal, triangular, or any other shape, including irregular shapes. For vegetated mats expected to be harvested earlier in the growing cycle, a generally smaller mesh size could be used than for those expected to be harvested later. The netting can be made in any length, any width, and any thickness. The netting can be biodegradable and/or non-biodegradable, as described herein. One source of netting material is Tipper Tie-net of West Chicago, Ill., which can provide a netting having strings made of HDPE tape, which are 5 mil before machine orientation, and which have a tensile strength of 2000+ grams.

Compost 3400

Exemplary embodiments of the vegetated mat system can utilize a filling such as compost or other growing media capable of supporting plant life, as described herein. In certain embodiments, the compost can be approximately 100% compost. In certain embodiments, the compost can include and/or be present with predetermined additives, such as those described herein, including one or more fertilizers, pre-emergents, herbicides, insecticides, pesticides, admixtures, aggregates, flocculants, polymers, chemical binders, and/or water absorbers, etc., chosen to enhance the vegetated mat system and/or its performance in a predetermined environment.

Seed 3500

Exemplary embodiments of the vegetated mat system comprise a plant material, such as seeds, seedlings, bulbs, plugs, sprouts, sprigs, cuttings, spores, colonies, etc., and/or other forms of propagated plant material. The plant material can be mixed with the compost prior to installation of the compost. For example, seed can be mixed with the compost and the mixture blown onto the netting material. The plant material can be installed simultaneously with the compost and/or after the compost. Further, the plant material can be inoculated with fungi, bacteria, and/or other microorganisms.

Exemplary embodiments of the vegetated mat system are not necessarily limited to any particular type, genus, and/or species of plant material. For example, vegetables, fungi, berries, flowers, crops, nursery stock, annuals, perennials, wildflowers, turf grasses, native grasses, beach plants, aquatic plants, desert plants, woodland plants, and/or marsh plants, etc., and a host of other plants and/or combinations of plants can possibly be grown in a vegetated mat system. Further, an entire rhizosphere and/or ecosystem can be established in a vegetated mat system. Moreover, any plant that is hard to establish in a mat or vegetated mat environment might benefit from this system because of the benefits of compost and netting. Exemplary embodiments of the vegetated mat system can provide a quickly transplantable vegetated mat when the window of good growing conditions does not allow native seeding procedures to allow for successful establishment.

Method 4000—Planting

Figure 4:
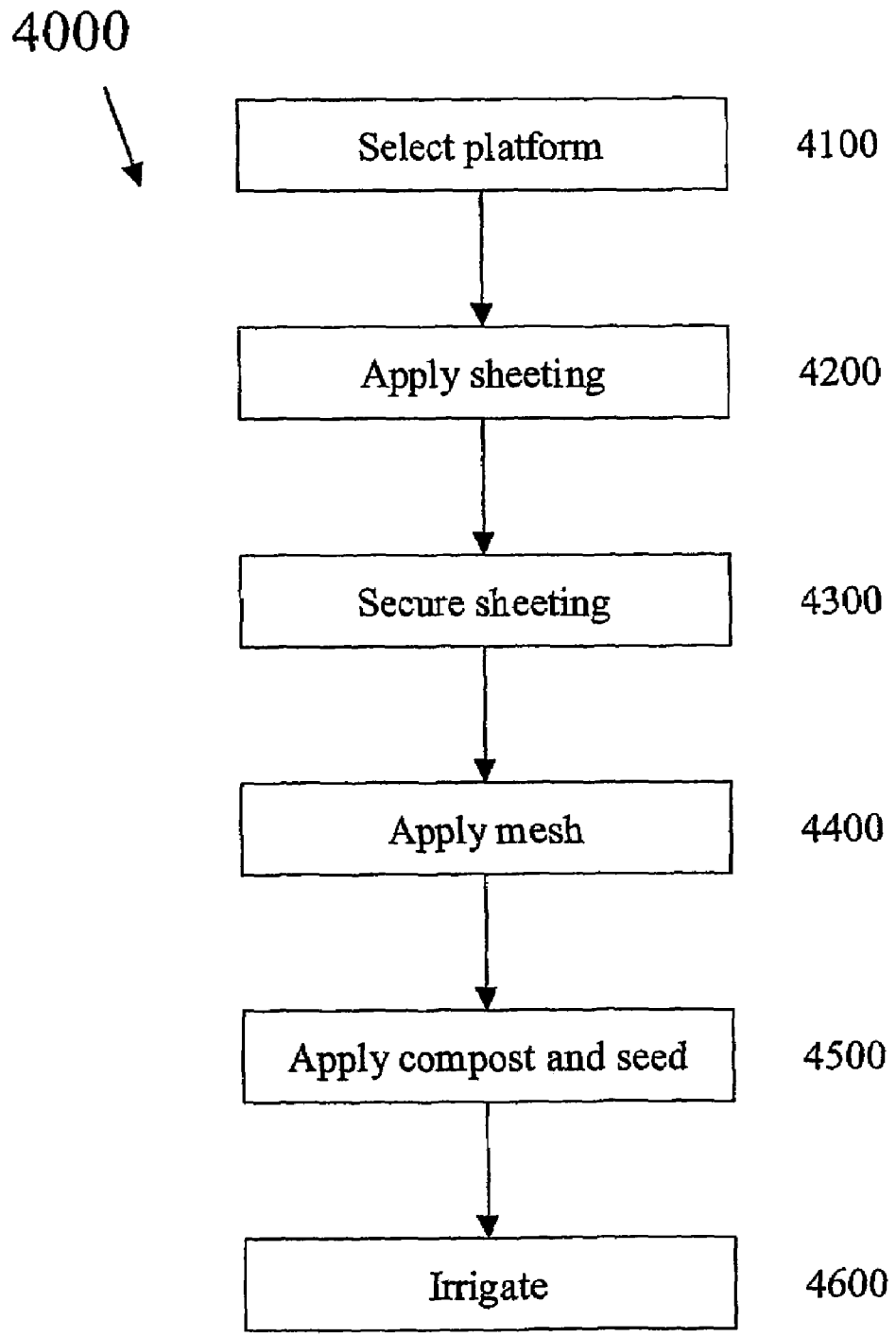
FIG. 4 is a flowchart of an exemplary embodiment of a method 4000.

FIG. 4 is a flowchart of an exemplary embodiment of a vegetated mat planting method 4000, which can include any number of activities, of which no particular activity or particular sequence of activities is necessarily required.

For example, at activity 4100, an area can be selected to serve as a platform for growing the vegetated mat (e.g., one square acre). The platform can be a parking lot, pavement, greenhouse table, sand area, or even existing turf. At activity 4200, the platform can be leveled and covered in plastic sheeting. Normal nursery grade sheeting, such as white Visqueen can be used. At activity 4300, the sheeting can be staked and/or weighted down, if desired.

At activity 4400, strips of plastic mesh netting can be rolled out parallel to each other, with about a 1 inch spacing between strips. The netting can be any width from approximately 0.5 feet to approximately 20 feet, including all values therebetween, such as for example approximately 0.75, 1.02, 1.97, 2.49, 3.001, 4, 5.1, 6, 7.98, 10.21, 12.03, 16, or 19.97, etc. feet, and including all sub-ranges therebetween, such as for example, approximately 2 feet to approximately 6 feet, etc. One or more layers of netting can be applied to a given area. In certain embodiments, a bottom layer is provided over the plastic sheeting, then the compost is applied. In certain embodiments, the bottom layer is applied and then a top layer is applied over the compost mixture, thereby forming a "compost sandwich". In yet another exemplary embodiment, multiple layers of netting are rolled out over each a common area, and compost is installed between the netting layers. The netting can be staked, if desired.

At activity 4500, compost and seed can be approximately evenly applied by any of a variety of methods, including manually, mechanically (with a spreader), and/or pneumatically, etc. The seen can be pre-mixed with the compost, delivered with a seed injection system via a blower truck, and/or applied after the compost. The layer of compost can be approximately 0.125 inches to approximately 2 inches thick, including all values therebetween, such as for example 0.2, 0.333, 0.51, 0.748, 1, 1.497, etc. inches, and including all sub-ranges therebetween, such as for example from about 0.25 to about 0.49 inches, etc.

At activity 4600, the mat can be irrigated as needed, such as two to four times daily during warm days, by any irrigation means, including manually, via sprinklers, and/or from overhead irrigation or equivalent.

Method 5000—Harvesting and Installation

Because exemplary embodiments of the vegetated mat system can be laid down in convenient pre-cut strips of netting, all that is needed when harvest begins is a rolling device that pulls up the vegetated mat from the plastic. Thus, conventional harvesting equipment currently available for the traditional lawn turf market can be used to roll up the vegetation strips.

The vegetated mats can be provided in convenient shipping sizes, such as in strips of from approximately 1 foot to approximately 10 foot in width, including all values therebetween, such as 2.02, 3.9, 6, etc. feet, and all sub-ranges therebetween. Rolls of the strips in the wider range can be provided if appropriate pallets are provided to assure adequate support. Otherwise, standard 48 inch pallets can be used.

Because traditional soil is not required as a growing platform and/or growing medium, exemplary embodiments of the vegetated mat system can eliminate the traditional below-grade "sod cutting" component of harvesting.

Once the vegetated mat begins growing on the plastic, reasonable care can be taken to harvest the mat and get the mat to market quickly. However, unsprouted vegetated mats and/or vegetated mats that have not fully rooted can also be a marketable commodity. Once the existing vegetated mat is removed, another crop may be planted immediately, reducing the need for working fields, etc. In this manner, harvested vegetated mats can be harvested, rolled, and/or placed upon pallets for delivery. With certain fast growing varieties of plants, germination can be present when the mat reaches the marketplace and the mat can be rolled into place as a partially or pre-germinated vegetated mat that can resist erosion.

Figure 5:
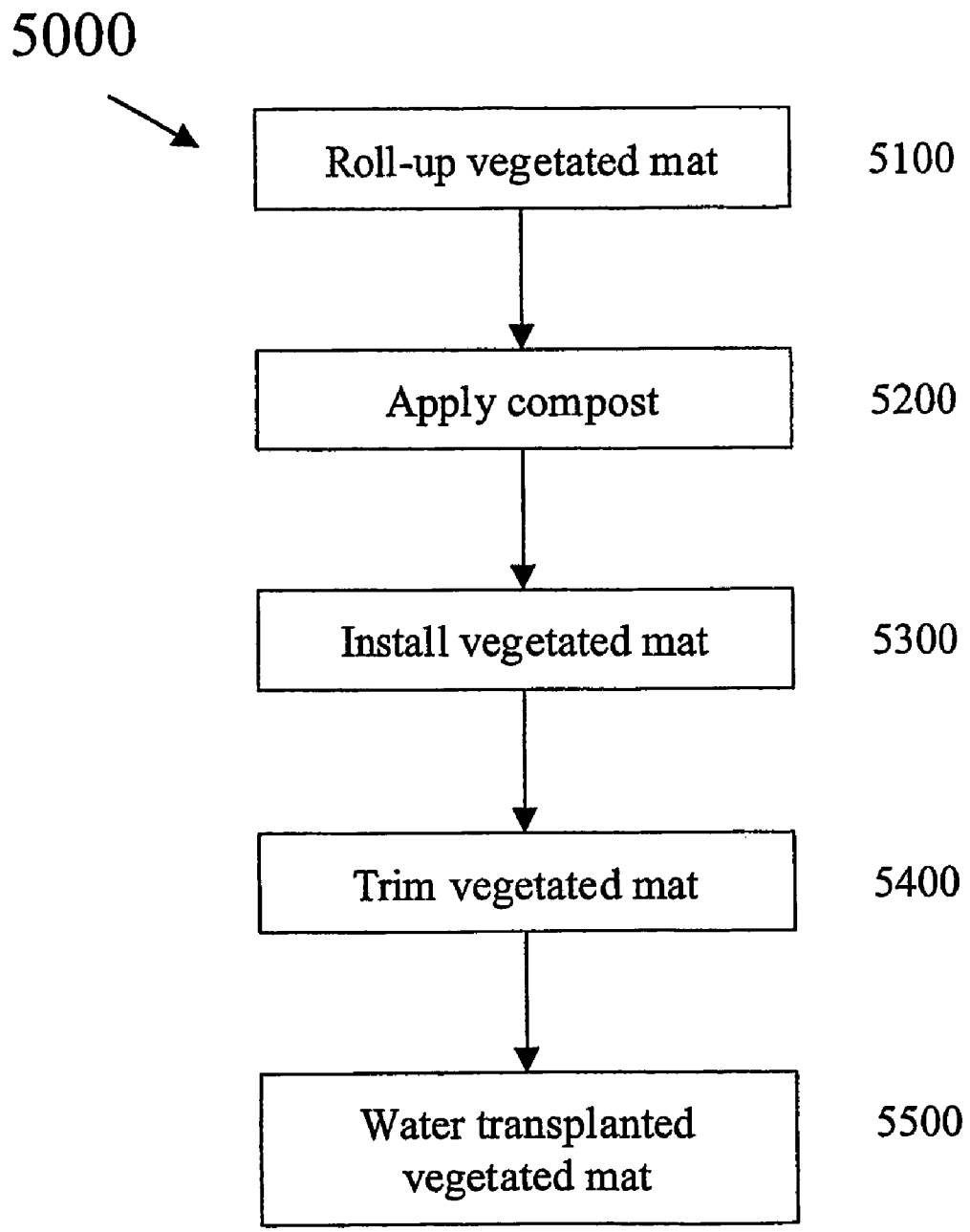
FIG. 5 is a flowchart of an exemplary embodiment of a method 5000.

FIG. 5 is a flowchart of an exemplary embodiment of a vegetated mat transplantation method 5000, which can comprise a number of activities, of which no particular activity or particular sequence of activities is necessarily required.

At activity 5100, about four to six weeks after planting, the vegetated mat can be simply rolled up either by hand and/or mechanically prior to being shipped. Certain embodiments can utilize mechanized sod rollers, such a Skid-Steer or Bobcat mounted sod harvester and/or roller.

At activity 5200, in certain situations, prior to placing the vegetated mat at the installation site, a relatively thin layer of compost can be applied to the soil receiving the vegetated mat. At activity 5300, the vegetated mat can be installed in areas that have adequate irrigation or during times of adequate rainfall to make sure the vegetated mat 'knits' into the underlying compost and/or existing soils. At activity 5400, during installation, the vegetated mat can be cut manually and/or mechanically to fit the areas required. At activity 5500, the vegetated mat can be watered. Watering can be frequent at first, tapering off over about 2 weeks to less frequent, more thorough intervals.

Environmental Impact

Certain exemplary embodiments of the vegetated mat system can use little or no chemicals to produce because compost generally does not need fertilizers and is generally naturally disease resistant to many soil-born diseases. For certain sites, compost used in the creation of exemplary embodiments of the vegetated mat system can benefit poor local soils. Also, the compost and/or vegetated mat can act as a long term soil conditioner, filter, and/or binder of contaminants that migrate onto, into, and/or through the vegetated mat. In specialized areas where cleanup is required, specially designed versions of the vegetated mat system can be employed, these systems created according to prescriptions derived from agronomic formulations for using compost, compost admixtures, and/or plant materials. Such systems can provide for a reduction of leaching; binding, absorbing, and/or adsorbing of nutrients, metals, potentially toxic compounds or chemicals; and/or resisting runoff of nutrients, sediment, and/or other environmental contaminants.

Figure 7:
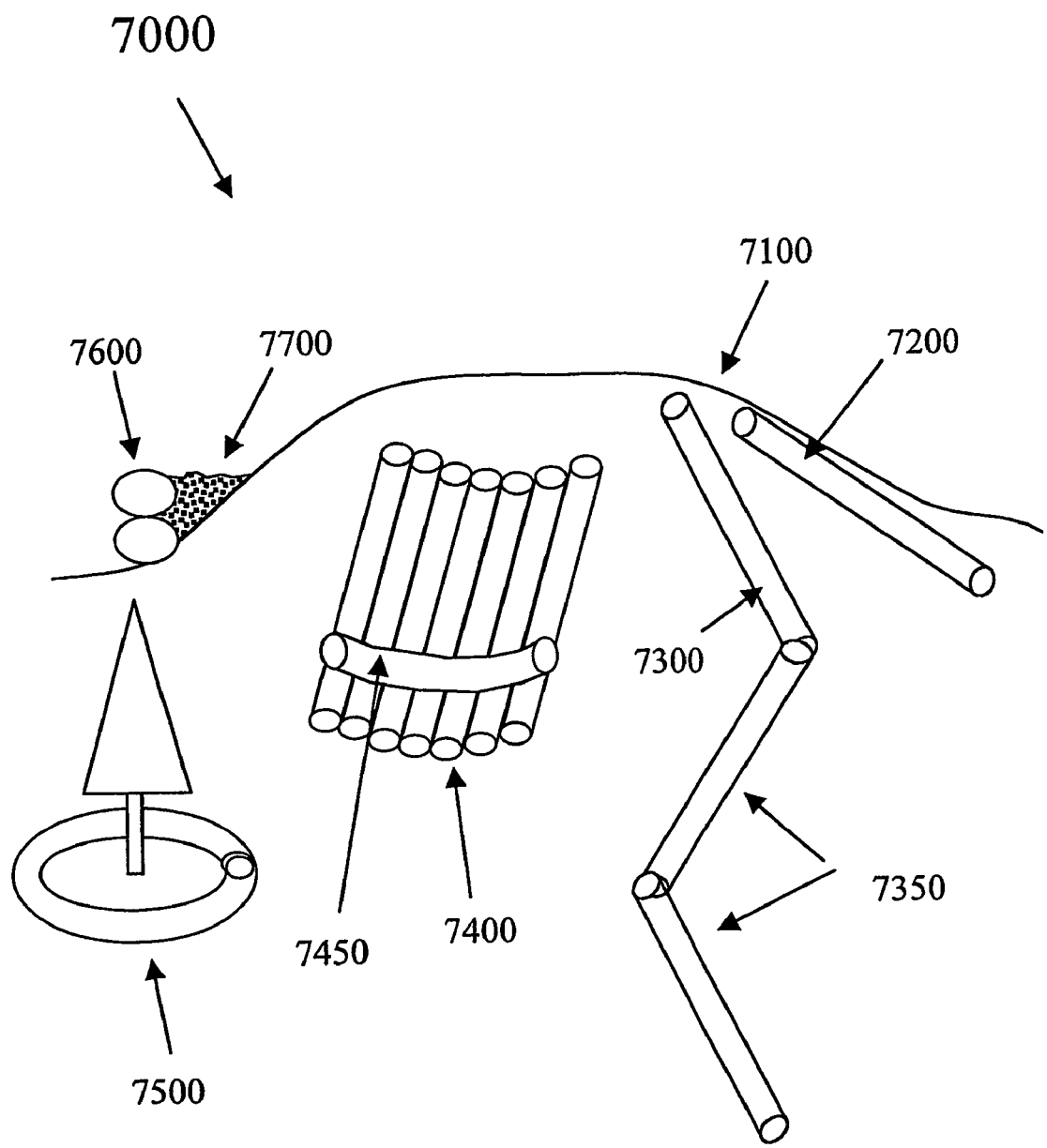
FIG. 7 is a perspective view of an exemplary embodiment of a system 7000.

FIG. 7 is a perspective view of an exemplary embodiment of a system 7000 that can be particularly useful for controlling water flow on a sloped surface. According to system 7000, any number of mesh tubes 7200, 7300, 7400 can be installed on a sloped surface 7100. A mesh tube, such as 7200, can be installed parallel to a local slope of the surface. That is, mesh tube 7200 can be installed parallel to an expected flow of run-off water on an adjacent portion of sloped surface 7100, which can prevent water from accumulating, standing, forming puddles, etc. Avoiding the accumulation of unwanted rain or other water can help decrease the likelihood of disease spread among a crop growing on the surface. Additional mesh tubes, such as 7300 can be installed parallel to water flow in a different portion of the surface having a different local slope. Any number of mesh tubes can be installed end-to-end.

In certain embodiments, a plurality of mesh tubes 7350 can be installed in a meandering, zig-zag, and/or herringbone pattern to maximize the mesh tube surface area encountered by water that flows by mesh tubes 7350, thereby potentially maximizing the filtering effect of mesh tubes 7350. Such an embodiment can be particularly useful when industrial, storm, and/or sewer waters must be treated prior to release. Moreover, the ground and/or soil bordered by such mesh tubes can also be lined with compost or other media capable of providing filtration.

In certain embodiments, a plurality of filled mesh tubes 7400 can be installed substantially adjacent each other and/or substantially parallel an expected flow of water in a channel or potential channel, such as a stream bed, gully, swale, ditch, and/or trench, etc. Such tubes can form and/or line a floor and/or side walls of the channel, thereby resisting erosion of the channel and/or replacing rip rap (large rocks) or check dams.

In certain embodiments, a mesh tube 7450 can be installed perpendicular and/or non-parallel to a local slope of the surface and/or an expected flow of water, to serve to baffle, divert, and/or slow run-off water flow and/or erosion in certain predetermined areas.

In certain embodiments, any mesh tube, such as mesh tubes 7350, 7400, 7450 can be used to divert flows of water that might otherwise cause flooding. For example, the mesh tube can be filled with a dense material, such as clay, that would allow a wall to be built capable of withstanding and/or diverting substantial flooding. Such embodiments can be a possible replacement for sand bags, which are commonly used for flood prevention and dike building, but can suffer from having multiple joints where water can penetrate.

In certain embodiments, a mesh tube 7500 can be installed such that a first end is adjacent and/or connected to an second end of mesh tube 7500, thereby forming a substantially closed shape, such as a circle, oval, polygon, etc. Mesh tube 7500 can serve to prevent water, sediment, contaminants, fertilizer, etc. from accessing a tree or other plant(s) surrounded by mesh tube 7500. Mesh tube 7500 can also filter any water that does pass through mesh tube 7500. Moreover, mesh tube 7500 can restrain water, sediment, contaminants, fertilizer, mulch, etc. within the substantially closed shape formed by mesh tube 7500, and/or filter water than passes through mesh tube 7500 to escape from within that shape. Thus, tube 7500 can be used to de-water manure, biosolids, factory sludges, papermill residuals, and/or other slurries or slurry-like materials.

In certain embodiments, one or more mesh tube, arranged in any configuration, can be installed and back-filled with a growing medium to elevate a growing zone contained therein. Within the fully and/or partially enclosed growing zone can be plants, such as for example, vegetables, berries, fruits, herbs, grains, crops, etc. Alternatively, the plants can grow from the top of the mesh tubes. In either case, growing the plants above-grade can potentially prevent the leaves, flowers, and/or fruit of the plants, or even the entire plants, from being exposed to soil, standing water, puddles, floods, splashes, etc., and thereby help prevent the establishment, growth, and/or spreading of soil-borne and/or water-borne pathogens, such as grey mold, *botrytis*, leaf spot, leaf blight, red stele, anthracnose, powdery mildew, leather rot, leak, *verticillium*, black root rot, leaflet rot, bud rot, yellow crinkle, hard rot, leaf blotch, *fusarium, rhizoctonia, pythium*, crown rot, etc. Moreover, if the plants are surrounded by such growing media as compost, the growing media can create a microclimate that can be slightly warmer than the soil at grade, thereby potentially preventing frost and/or snow damage to the plants and possibly decreasing time to market before fruiting/harvest begins.

Using mesh tubes to elevate plants can also raise the plants to a more workable elevation for gardeners, farmers, pickers, and/or others who tend to and/or harvest the plants. In unelevated zones between mesh tubes, vegetated mat and/or other groundcovers can be grown to enhance the drainage, human support attributes, and/or aesthetic performance of the unelevated zones.

Any of mesh tubes 7100-7500 can be color-coded to provide easy visual identification of a property of the tube, such as its nominal diameter or width, length, mesh size, material of construction, filling, product code, SKU, manufacturer, and/or distributor, etc. The tube can be primarily a single color, with a second, third, fourth, etc. color potentially used as a banding, stripe, spot, and/or in any other pattern to provide additional information. Such tubes can have stenciled names, numbers, logos, etc. imprinted thereon during the manufacturing process or afterward for product identification, marketing, etc. In certain embodiments, filled mesh tubes can be arranged such that they present a visible pattern, such as words, symbols, etc. when viewed from above, such as from an bridge, hilltop, and/or airplane.

Figure 8:
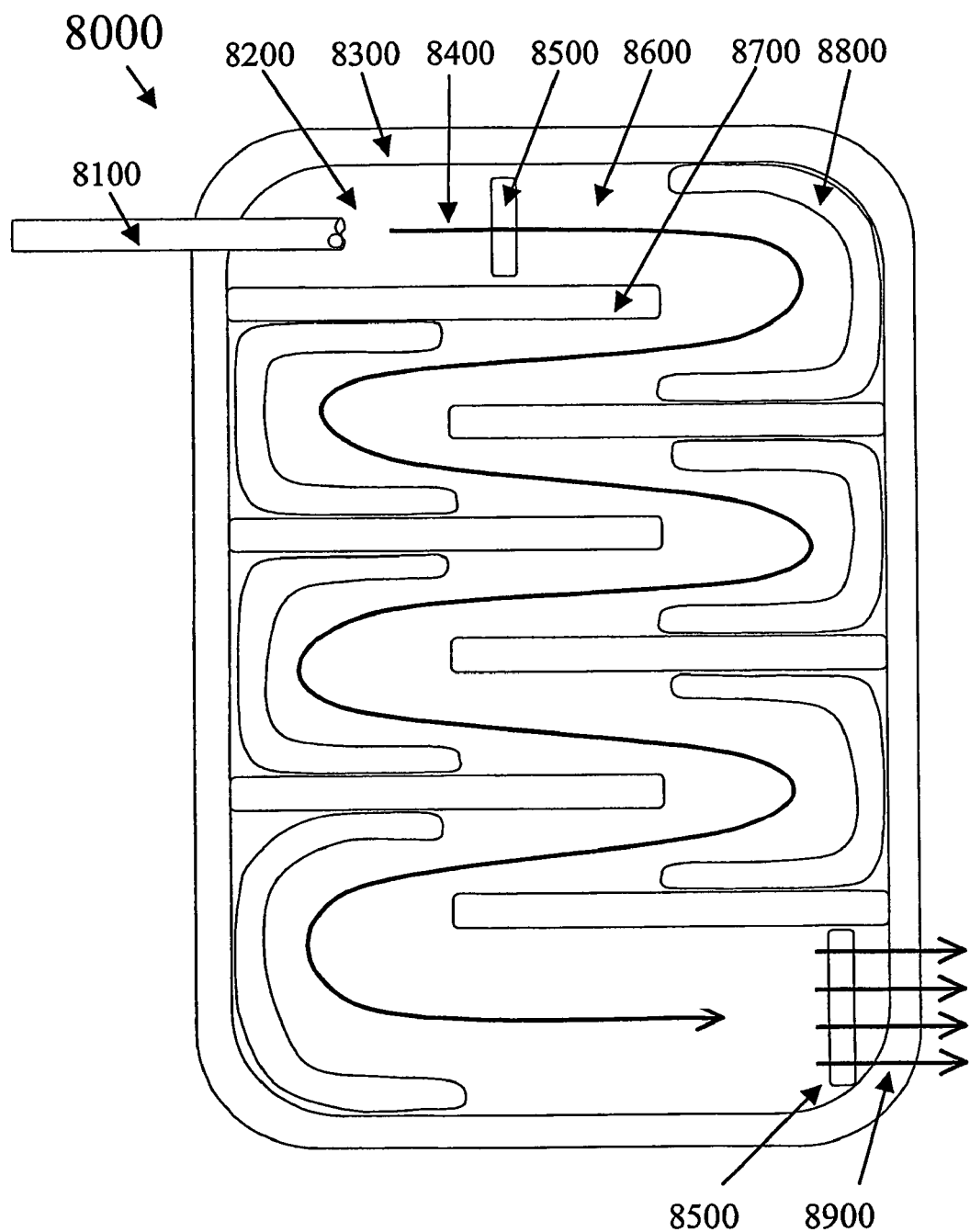
FIG. 8 is a top view of an exemplary embodiment of a retention pond system 8000.

FIG. 8 is a top view of an exemplary embodiment of a retention system 8000. System 8000 can comprise an influent, such as a liquid and/or slurry, flowing via pipe and/or inlet 8100 into a retention zone 8200, such as an enclosure, pond, marsh, etc. A wall 8300 defining retention zone 8200 can be formed of a mesh enclosure, such as a filled mesh tube, substantially as described herein. In certain exemplary embodiments, wall 8300 can be backed by an impermeable membrane and/or liner.

The influent can be storm water, spring water, stream water, outfall water from sewer treatment or drinking water plants, factory or farm discharges, contained contamination pumping discharges, run-off, and/or effluent, etc. The influent can follow a serpentine flow path 8400 through retention zone 8200, potentially encountering one or more overflow inlet weirs 8500 that can be substantially perpendicular to flow path 8400.

The serpentine flow path 8400 can flow across a floor 8600 of retention zone 8200, which can be formed of a plurality of filled mesh tubes, substantially as described herein, and/or one or more netting-backed and/or netting-reinforced vegetation mats, substantially as described herein. Floor 8600 can be sloped from an entrance to retention zone 8200 toward an exit of retention zone 8200 to facilitate flow. A slope of floor 8600 can be from about 0.25 percent to about 10 percent, including every value therebetween, such as about 0.999, 1.5, 2.1, 2.5, 3.0001, 5, 7.48, etc. percent, and every sub-range therebetween, such as from about 0.8 percent to about 1.25 percent, etc.

Serpentine flow path 8400 can be at least partially defined by one or more baffles 8700. The serpentine flow path 8400 also can be at least partially defined by, and/or influenced by, one or more flow diverters and/or erosion buffers 8800. Effluent can exit retention zone 8200 at outlet 8900, potentially after flowing over an outlet weir 8500.

Baffles 8700, buffers 8800, outlet 8900, and/or weir 8500 can be formed of one or more filled mesh tubes, substantially as described herein, and/or one or more netting-backed and/or netting-reinforced vegetation mats, substantially as described herein. Any component of system 8000, including inlet 8100, retention zone 8200, wall 8300, flow path 8400, weir 8500, floor 8600, baffle 8700, buffer 8800, and/or outlet 8900 can be designed, selected, constructed, arranged, dimensioned, sized, and/or installed in a predetermined manner to accommodate expected (design) and/or actual site conditions, hydraulic load, volume, flow rate, flow frequency, flow consistency, residence time, contaminant load, sediment load, filtering needs, decontamination needs, etc. For example, components of retention system 8000 can be designed to accommodate a maximum flowrate of from about 0.25 feet per second (fps) to about 15 fps or greater, including every value therebetween, such as about 0.3333, 0.5, 0.75, 0.9123, 1.023, 1.5, 2, 6.7, 9.9, 12.8, etc. fps, and every sub-range therebetween, such as from about 0.8 fps to about 1 fps, from about 1.02 fps to about 9 fps, etc.

Any of wall 8300, weir 8500, floor 8600, baffle 8700, buffer 8800, and/or outlet 8900 can be seeded and/or comprise plant material which can be chosen and/or planted in a predetermined manner to accommodate actual and/or expected site conditions. For example, a mesh tube and/or vegetation mat of retention system 8000 can be seeded with local native species, such as high marsh and/or low marsh vegetation, per Metropolitan Washington Council of Governments (MWCG) guidelines.

It should be understood that the preceding is merely a detailed description of one or more exemplary embodiments and that numerous changes to the disclosed embodiments can be made in accordance with the disclosure herein without departing from the spirit or scope of the invention. The preceding description, therefore, is not meant to limit the scope of the invention. Rather, the scope of the invention is to be determined only by the appended claims, every element of which can be replaced by any one of numerous equivalent alternatives without departing from the spirit or scope of the invention, only some of which equivalent alternatives are disclosed in the specification.

What is claimed is:

1. A system comprising:
a first tubular mesh enclosure formed from a mesh material having a nominal opening size of less than 0.5 inches, said first tubular mesh enclosure having a first opposing pair of ends, at least one of said first opposing pair of ends sealed; and
a filling surrounded by said first tubular mesh enclosure;
a second tubular mesh enclosure attached to said first tubular mesh enclosure;
said system defining a first length and a first generally non-circular longitudinal cross-section defining a first major width, a first ratio of said first length to said first major width greater than approximately 40.

2. The system of claim 1, further comprising a means for anchoring said first tubular mesh enclosure.

3. The system of claim 1, further comprising a means for anchoring said first tubular mesh enclosure to a surface, said means for anchoring said first tubular mesh enclosure attached to said first tubular mesh enclosure.

4. The system of claim 1, further comprising an anchor flap attached to said first tubular mesh enclosure.

5. The system of claim 1, further comprising an anchor flap attached to said first tubular mesh enclosure, said anchor flap penetrable by a stake.

6. The system of claim 1, further comprising an anchor flap attached to said first tubular mesh enclosure, said anchor flap attachable to a surface via a stake.

7. The system of claim 1, further comprising an anchor flap attached to said first tubular mesh enclosure, and a anchor for securing said anchor flap to a geo-surface.

8. The system of claim 1, further comprising an anchor flap attached to said first tubular mesh enclosure, and a means for securing said anchor flap to a geo-surface.

9. The system of claim 1, further comprising an additional quantity of said filling placed against an outer surface of said first tubular mesh enclosure.

10. The system of claim 1, further comprising a said second tubular mesh enclosure is stacked above said first tubular mesh enclosure.

11. The system of claim 1, wherein said second tubular mesh enclosure is attached to an end portion of said first tubular mesh enclosure.

12. The system of claim 1, wherein said second tubular mesh enclosure is attached to an end portion of said first tubular mesh enclosure, said second tubular mesh enclosure surrounding said filling.

13. The system of claim 1, wherein said second tubular mesh enclosure is attached to an end portion of said first tubular mesh enclosure, said second tubular mesh enclosure formed from a mesh material having a nominal opening size of less than 0.5 inches, said second tubular mesh enclosure having a second opposing pair of ends, at least one of said second opposing pair of ends sealed, said second tubular mesh enclosure surrounding said filling.

14. The system of claim 1, wherein said first tubular mesh enclosure is fabricated from a material selected from cotton, hemp, burlap, plastic, biodegradable plastic, and UV sensitive plastic.

15. The system of claim 1, wherein said first tubular mesh enclosure is fabricated from a material selected from UV inhibited plastic, polyester, polypropylene, multi-filament polypropylene, polyethylene, LDPE, HDPE, rayon, and nylon.

16. The system of claim 1, wherein said first tubular mesh enclosure is biodegradable.

17. The system of claim 1, wherein said first generally non-circular cross-section is generally triangular.

18. The system of claim 1, wherein said first generally non-circular cross-section is generally square.

19. The system of claim 1, wherein said first generally non-circular cross-section is generally rectangular.

20. The system of claim 1, wherein said first tubular mesh enclosure defines a generally flat bottom surface extending along said first length.

21. The system of claim 1, wherein said filling is pneumatically-provided.

22. The system of claim 1, wherein said filling is auger-provided.

23. The system of claim 1, wherein said filling is manually-provided.

24. The system of claim 1, wherein said first tubular mesh enclosure is filled at a site where said first tubular mesh enclosure is to be installed.

25. The system of claim 1, wherein said first tubular mesh enclosure is filled in situ.

26. The system of claim 1, wherein said filling is approximately 100 percent compost.

27. The system of claim 1, wherein said filling comprises compost.

28. The system of claim 1, wherein said filling comprises composted product.

29. The system of claim 1, wherein said filling comprises mulch.

30. The system of claim 1, wherein said filling comprises wood shavings.

31. The system of claim 1, wherein said filling comprises alum.

32. The system of claim 1, wherein said filling comprises lime.

33. The system of claim 1, wherein said filling comprises clay.

34. The system of claim 1, wherein said filling comprises pea gravel.

35. The system of claim 1, wherein said filling comprises gravel.

36. The system of claim 1, wherein said filling comprises sand.

37. The system of claim 1, wherein said filling comprises soil.

38. The system of claim 1, wherein said filling comprises wood chips.

39. The system of claim 1, wherein said filling comprises bark.

40. The system of claim 1, wherein said filling comprises peat.

41. The system of claim 1, wherein said filling comprises soil blends.

42. The system of claim 1, wherein said filling comprises hay.

43. The system of claim 1, wherein said filling comprises leaves.

44. The system of claim 1, wherein said filling comprises sawdust.

45. The system of claim 1, wherein said filling comprises paper mill residuals.

46. The system of claim 1, wherein said filling comprises wood wastes.

47. The system of claim 1, wherein said filling comprises wood pellets.

48. The system of claim 1, wherein said filling comprises hemp.

49. The system of claim 1, wherein said filling comprises bamboo.

50. The system of claim 1, wherein said filling comprises rice hulls.

51. The system of claim 1, wherein said filling comprises soybean hulls.

52. The system of claim 1, wherein said filling comprises palm wastes.

53. The system of claim 1, wherein said filling comprises palm leaves.

54. The system of claim 1, wherein said filling comprises agricultural waste products.

55. The system of claim 1, wherein said filling comprises manure.

56. The system of claim 1, wherein said filling comprises wool.

57. The system of claim 1, wherein said filling comprises hair.

58. The system of claim 1, wherein said filling comprises sugar cane bagasse.

59. The system of claim 1, wherein said filling comprises seed hulls.

60. The system of claim 1, wherein said filling comprises jute.

61. The system of claim 1, wherein said filling comprises flax.

62. The system of claim 1, wherein said filling comprises hulls.

63. The system of claim 1, wherein said filling comprises organic waste.

64. The system of claim 1, wherein said filling comprises cat litter.

65. The system of claim 1, wherein said filling comprises plant seeds.

66. The system of claim 1, wherein said filling comprises spores.

67. The system of claim 1, wherein said filling comprises at least one rhizosphere.

68. The system of claim 1, wherein said filling comprises at least one colony.

69. The system of claim 1, wherein said filling comprises a fungal component.

70. The system of claim 1, wherein said filling comprises a fungal component that is inoculated onto a substrate.

71. The system of claim 1, wherein said filling comprises plugs.

72. The system of claim 1, wherein said filling comprises sprigs.

73. The system of claim 1, wherein said filling comprises fertilizer.

74. The system of claim 1, wherein said filling comprises flocculants.

75. The system of claim 1, wherein said filling comprises chemical binders.

76. The system of claim 1, wherein said filling comprises a water absorbent.

77. The system of claim 1, wherein both of said ends are closed.

78. The system of claim 1, wherein said first tubular mesh enclosure is attached to the ground.

79. The system of claim 1, wherein said first tubular mesh enclosure is knitted.

80. The system of claim 1, wherein said first tubular mesh enclosure is welded.

81. The system of claim 1, wherein said first tubular mesh enclosure is extruded.

82. The system of claim 1, wherein said first tubular mesh enclosure is sewn.

83. The system of claim 1, wherein said first tubular mesh enclosure is stapled.

84. The system of claim 1, wherein said major width is greater than approximately 4 inches.

85. The system of claim 1, wherein said major width is greater than approximately 6 inches.

86. The system of claim 1, wherein said major width is greater than approximately 8 inches.

87. The system of claim 1, wherein said major width is greater than approximately 12 inches.

88. The system of claim 1, wherein said major width is less than approximately 18 inches.

89. The system of claim 1, wherein said major width is less than approximately 21 inches.

90. The system of claim 1, wherein said major width is less than approximately 24 inches.

91. The system of claim 1, wherein said major width is less than approximately 27 inches.

92. The system of claim 1, wherein said major width is less than approximately 30 inches.

93. The system of claim 1, wherein said filling surrounds a means for providing drip irrigation.

94. The system of claim 1, wherein said filling surrounds an irrigation hose.

95. The system of claim 1, wherein said first tubular mesh enclosure is fabricated from a starch.

96. The system of claim 1, wherein said first tubular mesh enclosure is fabricated from a starch-based polymer.

97. The system of claim 1, wherein said first tubular mesh enclosure is fabricated from a material providing a color-coded product identification system.

98. The system of claim 1, wherein said first tubular mesh enclosure provides a product identification system comprising a plurality of colors.

99. The system of claim 1, further comprising a landscaping material constrained to a predetermined zone by said first tubular mesh enclosure.

100. The system of claim 1, further comprising a landscaping material constrained to a predetermined zone outside of said first tubular mesh enclosure.

101. The system of claim 1, further comprising a landscaping material contained outside said first tubular mesh enclosure.

102. The system of claim 1, wherein, in an operative embodiment, said first tubular mesh enclosure is positioned to border a landscaping material.

103. The system of claim 1, further comprising a growing medium contained outside said first tubular mesh enclosure.

104. The system of claim 1, further comprising an elevated growing zone bordering and outside said first tubular mesh enclosure.

105. The system of claim 1, wherein, in an operative embodiment, said first tubular mesh enclosure is positioned such that said first opposing pair of ends are in contact with each other.

106. The system of claim 1, wherein, in an operative embodiment, said first tubular mesh enclosure is positioned such that said first length surrounds a predetermined zone.

107. The system of claim 1, wherein, in an operative embodiment, said first tubular mesh enclosure is positioned such that said first length at least partially surrounds a predetermined zone.

108. The system of claim 1, wherein, in an operative embodiment, said first tubular mesh enclosure is positioned such that said first length borders a predetermined zone.

109. The system of claim 1, wherein, in an operative embodiment, said first tubular mesh enclosure is positioned such that said first length at least partially contains a predetermined zone.

110. The system of claim 1, wherein, in an operative embodiment, a vegetation zone is provided between two of said first tubular mesh enclosures.

111. The system of claim 1, further comprising a plurality of plants growing out of said first tubular mesh enclosure.

112. The system of claim 1, wherein, in an operative embodiment, said first tubular mesh enclosure elevates a plurality of plants growing out of said first tubular mesh enclosure.

113. The system of claim 1, wherein, in an operative embodiment, said first tubular mesh enclosure elevates a plurality of crop plants growing out of said first tubular mesh enclosure.

114. The system of claim 1, wherein, in an operative embodiment, said first tubular mesh enclosure elevates a plurality of vegetable plants growing out of said first tubular mesh enclosure.

115. The system of claim 1, wherein, in an operative embodiment, said first tubular mesh enclosure elevates a plurality of fruit plants growing out of said first tubular mesh enclosure.

116. The system of claim 1, wherein, in an operative embodiment, said first tubular mesh enclosure is positioned along a landscape architectural element.

117. The system of claim 1, wherein, in an operative embodiment, said first tubular mesh enclosure is positioned adjacent a landscape architectural element selected from the group comprising an: archway, arbor, pergola, rafter, purlin, column, balustrade, trellis, post, pedestal, statute, ornament, planter, and a roof.

118. The system of claim 1, wherein, in an operative embodiment, said first tubular mesh enclosure is at least partially supported by a landscape architectural element selected from the group comprising an: archway, arbor, pergola, rafter, purlin, column, balustrade, trellis, post, pedestal, statute, ornament, planter, and a roof.

119. A system comprising:
a first tubular mesh enclosure formed from a mesh material having a nominal opening size of less than 0.5 inches, said first tubular mesh enclosure having an opposing pair of ends, at least one of said opposing pair of ends sealed;
a second tubular mesh enclosure attached to said first tubular mesh enclosure;
a filling surrounded by said first tubular mesh enclosure; and
an irrigation hose surrounded by said filling;
said systemfirst tubular mesh enclosure defining a length and a longitudinal cross-section defining a major width, a ratio of said length to said major width greater than approximately 40.

120. A system comprising:
a first tubular mesh enclosure formed from a cotton mesh material having a nominal opening size of less than 0.5 inches, said first tubular mesh enclosure having an opposing pair of ends, at least one of said opposing pair of ends sealed; and
a filling surrounded by said first tubular mesh enclosure;
a second tubular mesh enclosure attached to said first tubular mesh enclosure;
said first tubular mesh enclosure system defining a length and a longitudinal cross-section defining a major width, a ratio of said length to said major width greater than approximately 40.

121. A method comprising the activities of:
placing a filling into a first mesh tube formed from a mesh material having a nominal opening size of less than 0.5 inches, a ratio of a length of the first mesh tube to a major width of the mesh tube greater than 40, the first mesh tube having a substantially flat side, said first mesh tube attached to a second mesh tube; and
providing the mesh tube to a predetermined area.

122. A method comprising the activities of:
placing a filling into a first tubular mesh enclosure formed from a mesh material having a nominal opening size of less than 0.5 inches, said first tubular mesh enclosure having an opposing pair of ends, at least one of said opposing pair of ends sealed, said first tubular mesh enclosure defining a length and a non-circular cross-section defining a major width, a ratio of said length to said major width greater than approximately 40, a second tubular mesh enclosure attached to said first tubular mesh enclosure; and
providing the first tubular mesh enclosure to a predetermined area.

123. The method of claim 122, further comprising closing at least one of said opposing pair of ends.

124. The method of claim 122, further comprising sealing at least one of said opposing pair of ends.

125. The method of claim 122, further comprising sealing a distal end selected from said opposing pair of ends.

126. The method of claim 122, further comprising securing the first tubular mesh enclosure to a surface.

127. The method of claim 122, further comprising securing the first tubular mesh enclosure to a surface prior to said placing a filling activity.

128. The method of claim 122, further comprising securing the first tubular mesh enclosure to a surface subsequent to said placing a filling activity.

129. The method of claim 122, further comprising inserting a hose into an open end selected from said opposing pair of ends.

130. The method of claim 122, further comprising inserting an irrigation hose into the first tubular mesh enclosure.

131. The method of claim 122, further comprising inserting an irrigation hose into the first tubular mesh enclosure prior to said placing a filling activity.

132. The method of claim 122, further comprising inserting a fertigation hose into the first tubular mesh enclosure.

133. The method of claim 122, further comprising inserting a liquid fertilizing irrigation hose into the first tubular mesh enclosure.

134. The method of claim 122, further comprising inserting a blower hose into an open proximate end selected from said opposing pair of ends.

135. The method of claim 122, further comprising inserting an auger hose into an open proximate end of the first tubular mesh enclosure.

136. The method of claim 122, further comprising inserting an attachment coupleable to a hose into an open end selected from said opposing pair of ends, the attachment having a non-circular longitudinal cross-section.

137. The method of claim 122, further comprising inserting an attachment coupleable to a hose into an open end selected from said opposing pair of ends, the attachment having a longitudinal cross-section comprising at least one substantially flat side.

138. The method of claim 122, further comprising discharging the filling from a hose into the first tubular mesh enclosure.

139. The method of claim 122, further comprising withdrawing a hose from the first tubular mesh enclosure.

140. The method of claim 122, further comprising spooling the first tubular mesh enclosure subsequent to said filling activity.

141. The method of claim 122, further comprising palletizing the first tubular mesh enclosure subsequent to said filling activity.

142. The method of claim 122, further comprising placing the first tubular mesh enclosure adjacent a play area subsequent to said filling activity.

143. The method of claim 122, further comprising placing mulch adjacent to the first tubular mesh enclosure.

144. The method of claim 122, further comprising placing a filling supplement into the first tubular mesh enclosure.

145. The method of claim 122, further comprising placing a filling supplement into the first tubular mesh enclosure, the filling supplement selected from: seeds, spores, plugs, sprigs, fertilizer, flocculant, chemical binder, water absorbent, herbicide, insecticide and pesticide.

146. The method of claim 122, further comprising inserting a plant into the first tubular mesh enclosure.

147. The method of claim 122, further comprising inserting a plurality of plants into a top of the first tubular mesh enclosure.

148. The method of claim 122, wherein said placing activity occurs in an erosion-control zone.

149. The method of claim 122, wherein said placing activity occurs in-situ.

150. The method of claim 122, wherein the filling is placed via auger.

151. The method of claim 122, wherein the filling is placed via a chipping device.

152. The method of claim 122, wherein the filling is placed via a grinding device.

153. The method of claim 122, wherein the filling is placed pneumatically.

154. The method of claim 122, wherein the filling is placed manually.

155. The method of claim 122, wherein said first tubular mesh enclosure is located in the erosion-prone area prior to said placing activity.

156. The method of claim 122, wherein the predetermined area is prone to effluent flow.

157. The method of claim 122, wherein the predetermined area is prone to storm water flow.

158. The system of claim 122, wherein the predetermined area comprises a landscape architectural element selected from the group comprising an: archway, arbor, pergola, rafter, purlin, column, balustrade, trellis, post, pedestal, statute, ornament, planter, and a roof.

159. The method of claim 122, wherein the first tubular mesh enclosure borders the predetermined area.

160. The method of claim 122, wherein the first tubular mesh enclosure is placed substantially perpendicular to another a third tubular mesh enclosure.

161. The method of claim 122, wherein the first tubular mesh enclosure is placed in concert with a plurality of tubular mesh enclosures, said plurality of tubular mesh enclosures arranged in a herringbone pattern.

162. The method of claim 122, wherein the first tubular mesh enclosure is placed in concert with a plurality of tubular mesh enclosures, said plurality of tubular mesh enclosures arranged in a herringbone drainage pattern that creates a meandering effluent treatment system.

163. The method of claim 122, wherein the first tubular mesh enclosure is placed substantially parallel to a slope of the predetermined area.

164. The method of claim 122, wherein the first tubular mesh enclosure is placed substantially parallel to a direction of water flow for the predetermined area.

165. The method of claim 122, wherein the first tubular mesh enclosure is placed substantially parallel to a strip of vegetation.

166. The method of claim 122, wherein the first tubular mesh enclosure is placed substantially parallel to a strip of grass.

167. The method of claim 122, wherein the filling comprises compost.

168. The method of claim 122, wherein the filling comprises clay.

169. The method of claim 122, further comprising providing an auxiliary filler.

170. The method of claim 122, wherein the filling is placed via straw blower.

171. A method for forming a storm water control device comprising:

placing a compost-based filling into a first tubular mesh enclosure formed from a mesh material having a nominal opening size of less than 0.5 inches, a ratio of a length of the first tubular mesh enclosure to a width of the first tubular mesh enclosure greater than 40, a second tubular mesh enclosure attached to said first tubular mesh enclosure; and providing the first tubular mesh enclosure to a location prone to storm-water flow.

172. A method for forming a sediment control device comprising:

placing a compost-based filling into a first tubular mesh enclosure formed from a mesh material having a nominal opening size of less than 0.5 inches, a ratio of a length of the first tubular mesh enclosure to a width of the first tubular mesh enclosure greater than 40, a second tubular mesh enclosure attached to said first tubular mesh enclosure; and providing the first tubular mesh enclosure to a location prone to sediment-containing water flow.

* * * * *

UNITED STATES PATENT AND TRADEMARK OFFICE
CERTIFICATE OF CORRECTION

PATENT NO. : 7,452,165 B2
APPLICATION NO. : 10/519637
DATED : November 18, 2008
INVENTOR(S) : Rodney W. Tyler Page 1 of 1

It is certified that error appears in the above-identified patent and that said Letters Patent is hereby corrected as shown below:

Col. 4, line 31, "fingi" should read --fungi--.

Col. 23, line 20, Claim 119, "systemfirst" should read --first--.

Col. 25, line 19, Claim 158, "system" should read --method--.

Signed and Sealed this

Third Day of February, 2009

JOHN DOLL
*Acting Director of the United States Patent and Trademark Office*